(12) United States Patent
Fukuda et al.

(10) Patent No.: US 7,382,101 B2
(45) Date of Patent: Jun. 3, 2008

(54) LIGHTING SYSTEM

(75) Inventors: Kenichi Fukuda, Osaka (JP); Koji Yamashita, Kyoto (JP); Atsushi Utsubo, Osaka (JP); Hiroshi Nohara, Hyogo (JP); Yukiya Kanazawa, Osaka (JP)

(73) Assignees: Matsushita Electric Industrial Co., Ltd., Osaka (JP); Matsushita Electric Works Ltd., Osaka (JP)

( * ) Notice: Subject to any disclaimer, the term of this patent is extended or adjusted under 35 U.S.C. 154(b) by 0 days.

(21) Appl. No.: 11/578,628

(22) PCT Filed: Apr. 22, 2005

(86) PCT No.: PCT/JP2005/007724

§ 371 (c)(1),
(2), (4) Date: Jun. 28, 2007

(87) PCT Pub. No.: WO2005/104631

PCT Pub. Date: Nov. 3, 2005

(65) Prior Publication Data

US 2007/0285032 A1 Dec. 13, 2007

(30) Foreign Application Priority Data

Apr. 23, 2004 (JP) ............................. 2004-127928
Apr. 23, 2004 (JP) ............................. 2004-127929

(51) Int. Cl.
*H05B 37/02* (2006.01)
(52) U.S. Cl. ..................................... 315/308; 315/283
(58) Field of Classification Search ........ 315/207–208, 315/209 R, 224–225, 246–247, 283, 291, 315/307–308, DIG. 5
See application file for complete search history.

(56) References Cited

U.S. PATENT DOCUMENTS

| | | | |
|---|---|---|---|
| 4,464,607 A * | 8/1984 | Peil et al. ................. | 315/209 R |
| 5,973,453 A | 10/1999 | Van Vliet et al. | |
| 6,049,179 A * | 4/2000 | Kisaichi et al. ............ | 315/307 |
| 6,184,632 B1 | 2/2001 | Kamata et al. | |
| 2004/0090188 A1* | 5/2004 | Ishizuka et al. ........... | 315/291 |
| 2004/0178748 A1* | 9/2004 | Hamaguchi et al. ........ | 315/291 |

FOREIGN PATENT DOCUMENTS

| | | |
|---|---|---|
| JP | 11-74095 | 3/1999 |
| JP | 2000-501563 | 2/2000 |

\* cited by examiner

*Primary Examiner*—Thuy Vinh Tran
*Assistant Examiner*—Tung X Le

(57) ABSTRACT

Disclosed is a lighting system capable of preventing damage to an outer-tube resulting from an outer-tube discharge that often occurs at the end of useful life of a lamp. The lighting system includes: a metal halide lamp having an arc tube housed within an outer tube; and a lamp lighting device for operating the metal halide lamp. The lamp lighting device includes: a power supply unit operable to supply an electric power to the metal halide lamp; a detecting unit operable to detect an electrical property of the metal halide lamp; a judging unit operable to judge, based on the detected electrical property, whether a currently occurring discharge is an outer-tube discharge; and an instructing unit operable to instruct the power supply unit to suspend or reduce the electric power supply to the metal halide lamp upon a judgment that the currently occurring discharge is an outer-tube discharge. The detection unit detects a lamp voltage. The judging unit judges that the currently occurring discharge is an outer-tube discharge if the detected lamp voltage differs from a lamp voltage under normal operation.

22 Claims, 32 Drawing Sheets

Switching Element Signal Waveform

Time Axis

—— Outer-Tube Discharge

------ Normal Discharge

——— Outer-Tube Discharge

------- Normal Discharge

LIGHTING SYSTEM

TECHNICAL FIELD

The present invention relates to a lighting system having a metal halide lamp and a lamp lighting device.

BACKGROUND ART

Metal halide lamps have been used as a light source of a lighting system in indoor and outdoor facilities. Recent years have seen the introduction of so-called ceramic metal halide lamps with an arc tube envelope made of a ceramic material.

With an envelope made of a ceramic material, the heat-resistance improves as compared with a conventional metal halide lamp having an envelop made of quartz glass. In addition, the ceramic material undergoes less reaction with a metal halide filled within the arc tube, so that the envelop can withstand a heavier wall load. As a result, ceramic metal halide lamps achieve higher lamp efficiency as compared with metal halide lamps having a quartz glass envelope. Hereinafter, a ceramic metal halide lamp is simply referred to as a "lamp", unless in the case where the lamp needs to be distinguished from a metal halide lamp with a quartz glass envelope.

In order to further improve the lamp efficiency, it is suggested to fill the envelope with metal halides including lanthanum series halides, such as cerium (Ce) and praseodymium (Pr), along with sodium halides (Na). It is also suggested to use a relatively narrow arc tube (satisfying L/D>4, where L denotes the inter-electrode distance, and D denotes the inner diameter of the arc tube)(See, for example, patent literature 1). The lamp described above is said to achieve high efficiency of 111-177 (lm/W).

Here, a description of the basic lamp structure is given.

As illustrated in FIG. 1, the lamp includes: an outer tube 3 that is closed at a first end and sealingly attached to a flare 2 at a second end; two power supply lines 4 and 5 that are partly buried within the flare 2 so as to place one end of each power supply line within the outer tube 3; an arc tube 6 supported within the outer tube 3 by the power supply lines 4 and 5; and a base 7 fixed to the second end of the outer tube 3.

The power supply lines 4 and 5 are connected to the base 7 and feed power supply received via the base 7 from an external source to a pair of electrodes disposed within the arc tube 6.

Note that the outer tube 3 is maintained under vacuum (reduced pressure) and that the arc tube is filled with metal halides and starting buffer gas.

Now, a discussion is given to lamp lighting devices for operating a lamp. In recent years, there is a greater demand for a lamp lighting device to be smaller and lighter, and have more sophisticated functions. In response to this demand, electronic-type lamp lighting devices are replacing magnetic-type lamp lighting devices. Generally, electronic-type lamp lighting devices for lamps employ the square-wave lighting method with the aim to avoid a phenomenon called "acoustic resonance", in which the lamp flickers when the frequency approaches a specific value.

According to the square-wave lighting method, the lamp current is limited within a high-frequency range to reduce the current components in size. In addition, the high frequency current is reversed in polarity within a low-frequency range in which no acoustic resonance is caused. Then, the high-frequency components are removed by a filter circuit. Thus, the square-wave current composed exclusively of low-frequency components is supplied to the lamp. In this way, the lamp is stably operated, while avoiding acoustic resonance.

Generally, the lamp voltage tends to increase with the passage of time after the initial stage of lamp operation. With the magnetic-type lamp lighting device, it is normally true that the lamp voltage required for re-starting the lamp operation increases with the increase in lamp voltage. Eventually, the lamp operation can no longer be maintained and the discharge fades out. On the other hand, an electronic-type lamp lighting device is capable of-lamp power control, so that the risk of discharge fading-out is smaller even after some duration of lamp operation.

Patent Literature 1: JP Patent Application Publication No. 2000-501563

DISCLOSURE OF THE INVENTION

Problems the Invention is Attempting to Solve

Although being relatively free from discharge fading-out, an electronic-type lamp lighting device involves heavier load on the lamp as compared with a magnetic-type lamp lighting device. With such a heavy load, the arc tube disposed within the outer tube deteriorates to reduce the hermeticity of the sealing of the arc tube. As a result, a phenomenon called leak occurs in which the starting buffer gas enclosed within the arc tube leaks out into the outer tube maintained under vacuum.

When a start-up pulse voltage is applied to a lamp under the leak condition, an arc discharge occurs between a lamp electrode and a conductor having a different potential (such as a power supply line) or between two conductors other than the electrodes (hereinafter, such discharge is referred to as "outer-tube discharge"). The outer-tube discharge of a certain duration will cause overheating of the base. If the base is made of a resin, the base may melt due to such heat. It should be noted that the outer-tube discharge may also occur with the use of a magnetic-type lamp lighting device.

Examples of techniques known to address occurrences of the outer-tube discharge includes a technique of filling the outer tube with nitrogen gas, instead of maintaining the outer tube under vacuum. Another example is to dispose a current fuse within a lamp. When overcurrent is supplied, the current fuse melts, thereby causing the power supply to be cut off (JP Patent No. 3126300).

Yet, the outer tube filled with nitrogen gas has harmful effects including lowering of the lamp efficiency as compared with a vacuumed outer tube. Similarly, the provision of a current fuse may not reliably cut off the power supply upon occurrence of an outer-tube discharge. Depending on the value of overcurrent, it may take too long before the current fuse starts to melt or the current fuse may not melt.

The problems described above are more notable with a lamp satisfying the relation $L/D \geqq 2$, as typified by the lamp disclosed in the patent literature 1. Such a lamp has a long and thin arc tube, which means that the distance between a pair of electrodes is inevitably long. This structure causes an outer-tube discharge more easily.

The present invention is made in view of the problems noted above and aims to provide a lighting system capable of preventing damage to the outer tube resulting from an outer-tube discharge, especially at the end of useful life of the lamp.

Means for Solving the Problems

In order to achieve the above-described aim, the present invention provides a lighting system including: a metal halide lamp having an arc tube housed within an outer tube; and a lamp lighting device for operating the metal halide lamp. The lamp lighting device includes: a power supply unit operable to supply an electric power to the metal halide lamp; a detecting unit operable to detect an electrical property of the metal halide lamp; a judging unit operable to judge, based on the detected electrical property, whether a currently occurring discharge is in either of (i) an outer-tube discharge state in which a discharge occurs inside the outer tube but outside the arc tube and (ii) a state preceding the outer-tube discharge state; and an instructing unit operable to instruct the power supply unit to suspend or reduce the electric power supply to the metal halide lamp up on a judgment by the judging unit that the currently occurring discharge is in either of the outer-tube discharge state and the preceding state.

The term "electrical property" used herein has a scope that includes, for example, the lamp voltage, the lamp current, the lamp power, and the power factor within its scope. That is, the term "electrical property" is of a concept superordinate to the individual properties mentioned above.

In addition, "to judge, based on the detected electrical property, whether a currently occurring discharge is in either of (i) an outer-tube discharge state in which a discharge occurs inside the outer tube but outside the arc tube and (ii) a state preceding the outer-tube discharge state" is made using the judgment criteria described in Examples 1, 4, 6, and 7. In other words, the term "judgment" is used in the claims as the concept covering the judgment criteria and the judgments described in the above-mentioned examples.

Here, the judging unit may be operable to judge that the currently occurring discharge is in either of the outer-tube discharge state and the preceding state, if the detected electrical property differs at least from an electrical property of the metal halide lamp under normal operation. Alternatively, the judging unit may be operable to judge that the currently occurring discharge is in either of the outer-tube discharge state and the preceding state, based on a characteristic specific to a discharge in the outer-tube discharge state or the preceding state.

The electrical property detected by the detecting unit may be at least either of a lamp current and a lamp voltage.

Here, the specific characteristic may be that the discharge repeats fading-out and re-starting. The judging unit may be operable to count, based on the detected electrical property, occurrences of fading-out or re-starting, and to judge that the currently occurring discharge is in either of the outer-tube discharge state and the preceding state if the count reaches a predetermined count. Alternatively, the specific characteristic may be that the electrical property fluctuates widely. The judging unit may be operable to count fluctuations of the detected electrical property beyond a reference level that is determined based on an electrical property of the metal halide lamp under normal operation, and to judge that the currently occurring discharge is in the outer-tube discharge state if the count reaches a predetermined count.

Here, the power supply unit may be operable to supply an alternating current power. The specific characteristic maybe that a half-wave discharge occurs. The judging unit may be operable to judge that the currently occurring discharge is in the outer-tube discharge state if the detecting unit repeatedly detects an electrical property specific to a half-wave discharge.

Here, the judging unit may be operable to judge that an electrical property specific to a half-wave discharge is repeatedly detected, if a duration or occurrences of the half-wave discharge reaches a predetermined value.

Alternatively, the specific characteristic may be that an outer-tube discharge stably continues. The judging unit may be operable to count a number of times that the detected electrical property exceeds a predetermined upper limit or that the detected electrical property is below a predetermined lower limit, and to judge that the currently occurring discharge is in the outer-tube discharge state if the count reaches a predetermined count. Alternatively, the specific characteristic may be that an outer-tube discharge stably continues. The judging unit may be operable to measure a duration that the detected electrical property exceeds a predetermined upper limit or that the detected electrical property is below a predetermined lower limit, and to judge that the currently occurring discharge is in the outer-tube discharge state if the measured duration reaches a predetermined duration.

Here, the power supply unit may be operable to supply an alternating current power that is cyclically reversed between positive and negative polarities. The detecting unit may be operable to detect the electrical property for the respective polarities. The judging unit may be operable to make a judgment based on the electrical property for the respective polarities. Alternatively, the power supply unit may be operable to supply an alternating current power that is cyclically reversed between positive and negative polarities. The specific characteristic may be that the electrical property abruptly changes immediately after polarity reversal. The detecting unit may be operable to detect the electrical property immediately after polarity reversal. The judging unit may be operable to judge that the currently occurring discharge is in the outer-tube discharge state, if the electrical property abruptly changes.

Here, the judging unit may be operable to judge that the electrical property changes abruptly, if the electrical property detected a predetermined time period after polarity reversal is equal to or greater than a predetermined value. Alternatively, the judging unit may be operable to judge that the electrical property abruptly changes, if an average or effective value calculated from the electrical property detected a predetermined time period after polarity reversal is equal to or greater than a predetermined value. Alternatively, the judging unit may be operable to judge that the currently occurring discharge is in the outer-tube discharge state, if a count of occurrences of abrupt changes immediately after polarity reversal reaches a predetermined count.

Here, the lamp lighting device may provide, for a predetermined time period from start-up of the metal halide lamp, a mask period during which the judgment unit is inhibited from judging whether the currently occurring discharge is in either of the outer-tube discharge state and the preceding state.

Here, the outer tube may be evacuated to vacuum. Alternatively, the outer tube may be filled with nitrogen gas. The arc tube may be filled with xenon gas as buffer gas.

Here, the arc tube may be filled with metal halides which at least include praseodymium halide and sodium halide. Alternatively, the arc tube may be filled with metal halides which at least include cerium halide and sodium halide. Here, the arc tube may include a pair of electrodes. The relation $L/D \geq 4$ may be satisfied, where D denotes an inner diameter of the arc tube in millimeters and L denotes a distance between the electrodes in millimeters.

Effects of the Invention

With the lighting system according to the present invention, upon a judgment that the currently occurring discharge is in the outer-tube discharge state or the state preceding the outer-tube discharge state, the power supply to the lamp is stopped or reduced. As a result, damage to the outer tube is prevented.

Figure 1:
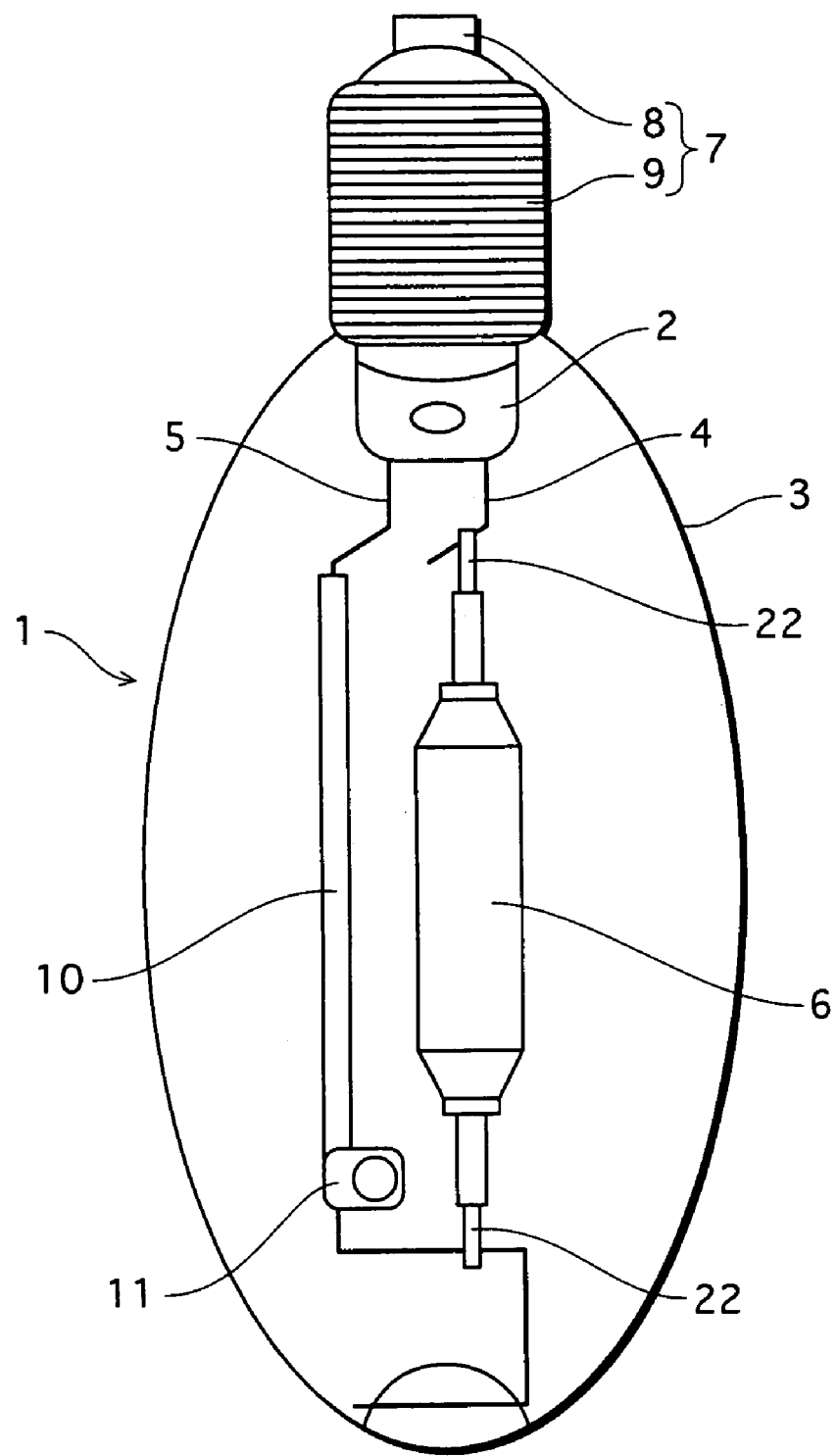
FIG. 1 illustrates the structure of a lamp according to an embodiment of the present invention.

| Reference Numerals | |
| --- | --- |
| 1 | Lamp |
| 3 | Outer Tube |
| 4 and 5 | Power Supply Lines |
| 6 | Arc Tube |
| 7 | Base |
| Q1-Q4 | Switching Elements |
| S1 | Control Unit |
| K1 and K2 | IC drivers |
| La | Lamp |

BEST MODE FOR CARRYING OUT THE INVENTION

Embodiment

1. Lamp

FIG. 1 illustrates the structure of a lamp according to an embodiment of the present invention.

The lamp 1 according to the present embodiment is a ceramic metal halide lamp with the rated lamp power of 150 W. The description below is given taken the lamp 1 as an example.

The lamp 1 is provided with: an outer tube 3 that is closed at a first end (the lower end in FIG. 1) and sealingly attached to a flare 2 at a second end; two power supply lines 4 and 5 that are partly buried within the flare 2 so as to place one end of each power supply line within the outer tube 3; an arc tube 6 supported within the outer tube 3 by the power supply lines 4 and 5; and a base 7 fixed to the second end of the outer tube 3. The base 7 is of a screw type (E type).

The outer tube 3 is made of, for example, hard glass or borosilicate glass and sealed with the flare 2 made of, for example, borosilicate glass. The outer tube 3 is maintained under vacuum of about $1 \times 10^{-1}$ (Pa) at a pressure of 300 (K) atmospheres. Naturally, it is appreciated that the outer tube 3 may be filled with nitrogen if necessary.

The outer tube 3 filled with nitrogen has an advantage that occurrences of an outer-tube discharge are reduced.

The power supply lines 4 and 5 are made of, for example, nickel or soft steel. The power supply lines 4 and 5 are partly sealed within the flare 2 in a manner that a first end of each power supply line is placed within the outer tube 3 and that a second end thereof is connected to the base 7 outside the outer tube 3. Note that the electrical connection with the base 7 is established by connecting the respective second ends of the power supply lines 4 and 5 to an eyelet 8 and a shell 9 of the base 7, respectively.

In addition, the part of the power supply line 5 placed within the outer tube 3 is sheathed with a tube 10 made of, for example, aluminum oxide. The tube 10 is provided for the purpose of preventing emission of photoelectron from the surface of the power supply line 5 during lamp operation. The power supply line 5 is further provided with a getter 11 for capturing impurity gas present within the outer tube 3 that is maintained under vacuum.

Figure 2:
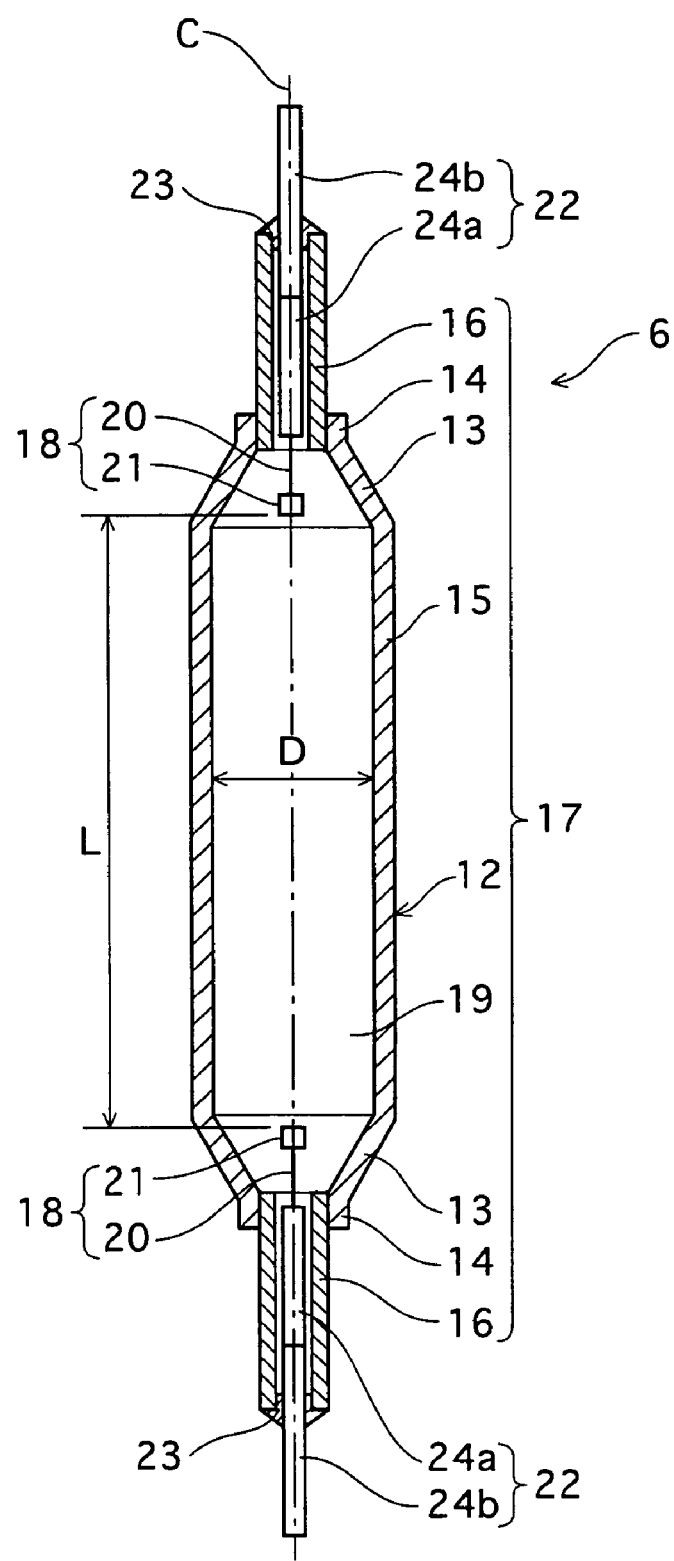
FIG. 2 is a sectional view of an arc tube illustrated in FIG. 1.

FIG. 2 is a sectional view of the arc tube.

As illustrated in FIG. 2, the arc tube 6 is provided with an envelope 17. The envelope 17 is composed of a tubular main tube 15 and a pair of thin tubes 16 provided at either end of the main tube 15. The main tube 15 is composed of a cylindrical portion 12, a pair of tapered portions 13 formed at either end of the cylindrical portion 12, and a pair of ring portions 14 formed at the end of either tapered portion 13 away from the cylindrical portion 12. Each thin tube 16 is coupled to a respective one of the ring portions 14 by, for example, shrinkage fitting. Note that the main and thin tubes 15 and 16 constituting the envelope 17 are made of polycrystalline alumina (i.e. ceramic material)

In the example illustrated in FIG. 2, the cylindrical portion 12, the tapered portions 13, and the ring portions 14 are integrally and seamlessly formed into the main tube 15. It is naturally applicable that the cylindrical portion, the tapered portions, and the ring portions are formed into a single piece by, for example, shrinkage fitting. In addition, it is also applicable that the main and thin tubes 15 and 16 are integrally formed as a single piece.

Alternatively to polycrystalline alumina, the envelope 17 may be made of a translucent ceramic material, such as yttrium aluminum garnet (YAG), aluminum nitride, yttria, or zirconia.

The arc tube 6 is filled with metal halides acting as light-emitting materials and also with a buffer gas for starting up lamp operation. Specifically, the examples of the metal halides include praseodymium iodide and sodium iodide, and the examples of the buffer gas filled in the arc tube 6 include xenon gas (Xe). The metal halides and the buffer gas are filled to a pressure of 20 (KPa) at ambient temperature. In addition to the metal halides and the buffer gas, liquid mercury is filled in a total amount of, for example, 10 mg.

The presence of the metal halides of praseodymium iodide and sodium iodide improves the luminous efficiency. The luminous efficiency also improves by the presence of cerium iodide and sodium iodide, instead of praseodymium iodide and sodium iodide. Other than the metal halides described above, any metal halide known in the art may be additionally enclosed for achieving a desired color temperature and color rendering property.

Inside the arc tube 6, a pair of electrodes 18 is disposed in opposed relation. As illustrated in FIG. 2, each electrode 18 is composed of an electrode rod 20 and an electrode coil 21 mounted at the tip of the electrode rod 20. At the end away from the electrode coil 21, the electrode rod 20 is attached to an electrode guide 22. Each electrode rod 20 is made of, for example, a tungsten rod that diametrically measures 0.5 mm. Each electrode coil 21 is made of, for example, tungsten similarly to the electrode rods 20.

Each electrode guide 22 is composed of a first member 24a and a second member 24b. Each first member 24a is made of, for example, molybdenum or conductive cermet and connected to the respective one of the electrode rods 20. Each second member 24b is made of, for example, niobium and coupled to the respective one of the first members 24a at one end and connected to a different one of the power supply lines 4 and 5 at the other end. The first and second members 24a and 24b each diametrically measure 0.9 mm, for example.

The electrode guides 22 are sealingly attached to the respective thin tubes 16, so that that the axes (denoted with the reference numeral "C" in FIG. 2) of the electrode rods 20 substantially coincide with each other and that electrodes 18 oppose to each other with a predetermined distance therebetween.

That is, each electrode guide 22 is inserted through a respective one of the thin tubes 16. Under this state, glass frit 23 is poured into the clearance formed between the inner surface of the thin tube 16 and the outer surface of the second member 24b. The glass frit 23 eventually hardens to join the electrode guide 22 to the thin tube 16, thereby hermetically-sassing the arc tube 6. Note that a discharge space 19 is formed in the main tube 15 between the opposing electrodes 18.

The inner diameter D of the cylindrical portion 12 of the arc tube 6 measures 4 mm, for example. The volumetric capacity of the arc tube 6 is, for example, 0.45 cc under the state where the electrodes 18 are inserted therein. The wall load of the arc tube 6 is set to fall within the range of, for example, 20-35W/cm$^2$.

In addition, the distance L between the electrodes 18 disposed inside the arc tube 6 (i.e., the distance between the tips of the electrode coils 21) is 32 mm, for example. Thus, L/D is equal to "8". Such dimensions improve the lamp efficiency and satisfy the relation $L/D \geq 2$. To further improve the lamp efficiency, it is more preferable to satisfy the relation $L/D \geq 4$.

2. Structure of Lamp Lighting Device

Figure 3:
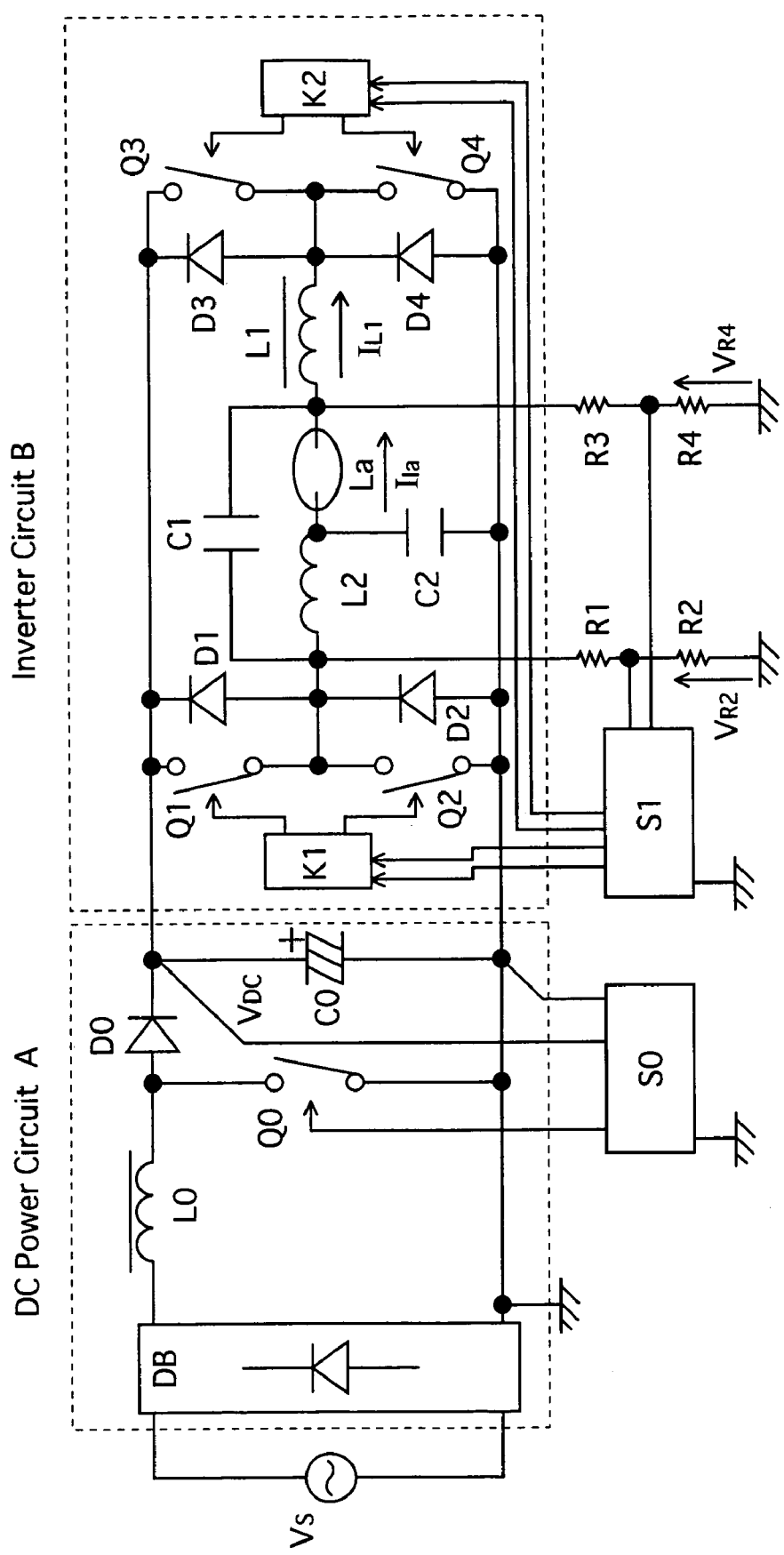
FIG. 3 is a circuit diagram of a lamp lighting device for operating the lamp.

FIG. 3 is a circuit diagram of a lamp lighting device for operating a lamp.

In FIG. 3, the lamp 1 having the above-described structure is denoted as a discharge lamp La.

The lamp lighting device according to the present invention employs the square-wave lighting method for the purpose of avoiding acoustic resonance, as described in the "Background Art" section above.

As illustrated in FIG. 3, the lamp lighting device includes a DC power circuit A and an inverter circuit B. The DC power circuit A is connected to an AC power source Vs. The inverter circuit B is connected to the output end of the DC power circuit A. The lamp La is connected to the output end of the inverter circuit B.

(1) DC Power Circuit A

The DC power circuit A is composed of a rectifier circuit DB, Step-up chopper circuit, and a smoothing capacitor C0. The DC power circuit A carries out rectifying and smoothing of an AC voltage supplied by the AC power source Vs into a DC voltage of a predetermined voltage value.

The rectifier circuit DB is a so-called bridge rectifier that employs, for example, a diode bridge. The rectifier circuit DB may be a rectifier circuit that employs a different electronic component, such as a GTO-thyristor.

The step-up chopper circuit includes an inductor L0, a switching element Q0, and a diode D0. The inductor L0 and the switching element Q0 constitute a series circuit and is connected to either end of the rectifier circuit DB. Furthermore, the diode D0 and the smoothing capacitor C0 constitute a series circuit and is connected in parallel to the switching element Q0.

The switching element Q0 may be an N-type field effect transistor (FET). In such a case, the base of the transistor is connected to a control unit S0. In addition, the drain of the transistor is connected between the inductor L0 and the diode D0. The source of the transistor is connected between the capacitor C0 and the rectifier circuit DB.

The control unit S0 controls the ON/OFF of the switching element Q0 based on the voltage VDC across the smoothing capacitor C0.

(2) Inverter Circuit B

The inverter circuit B is mainly composed of switching elements Q1-Q4, inductors L1 and L2, capacitors C1 and C2, an IC drivers K1 and K2 (for example, IR2308 manufactured by International Rectifier Corp.), and a control unit S1.

As illustrated in FIG. 3, the switching elements Q1 and Q2 are serially connected. Similarly, the switching elements Q3 and Q4 are serially connected. Those serially connected switching element pairs are connected in parallel to the DC power circuit A.

In addition, the inductor L2 and the capacitor C2 constitute an igniter circuit for generating high-voltage resonance pulses at the time of lamp start-up, which will be described later. The inductor L2 and the capacitor C2 are serially connected to each other. The serially connected inductor L2 and capacitor C2 are connected in parallel to the switching element Q2.

The lamp La and the inductor L1 are serially connected and placed between (i) the serially connected inductor L2 and capacitor C2 and (ii) the switching elements Q3 and Q4. In addition, the capacitor C1 for filtering is connected in parallel to the inductor L2 and the lamp La.

In order to detect the voltage of the lamp La, two pairs of resistors R1 & R2 and R3 & R4 are connected to either end of the lamp La. (More specifically, the pairs of resistors are connected one to the inductor L2 and the other to the lamp La, in this example. Yet, it is naturally appreciated that the pairs of resistors are connected both to the lamp La.) The control unit S1 controls, via the IC drivers K1 and K2, ON/OFF of the switching elements Q1, Q2, Q3, and Q4 based on the detection result of the voltage of the lamp La.

Each of the switching elements Q1, Q2, Q3, and Q4 is, for example, an N-type field effect transistor (FET). The source of the switching element Q1 is connected to the drain of the switching element Q2. Similarly, the source of the switching element Q3 is connected to the drain of the switching element Q4. The gate of each of the switching elements Q1 and Q2 is connected to the IC driver K1. Similarly, the gate of each of the switching elements Q3 and Q4 is connected to the IC driver K2.

The control unit S1 is comprised of a microcomputer and stores a correlation table showing the predetermined correlation between the lamp voltage and the lamp power (hereinafter, referred to as a "table W"). The control unit S1 detects the lamp voltage using the resistors R1-R4, and controls ON/OFF of the switching elements Q1-Q4 with reference to the table W based on the detected lamp voltage. Under the control by the control unit S1, the electric power supply to the lamp 1 is appropriately adjusted.

Figure 4:
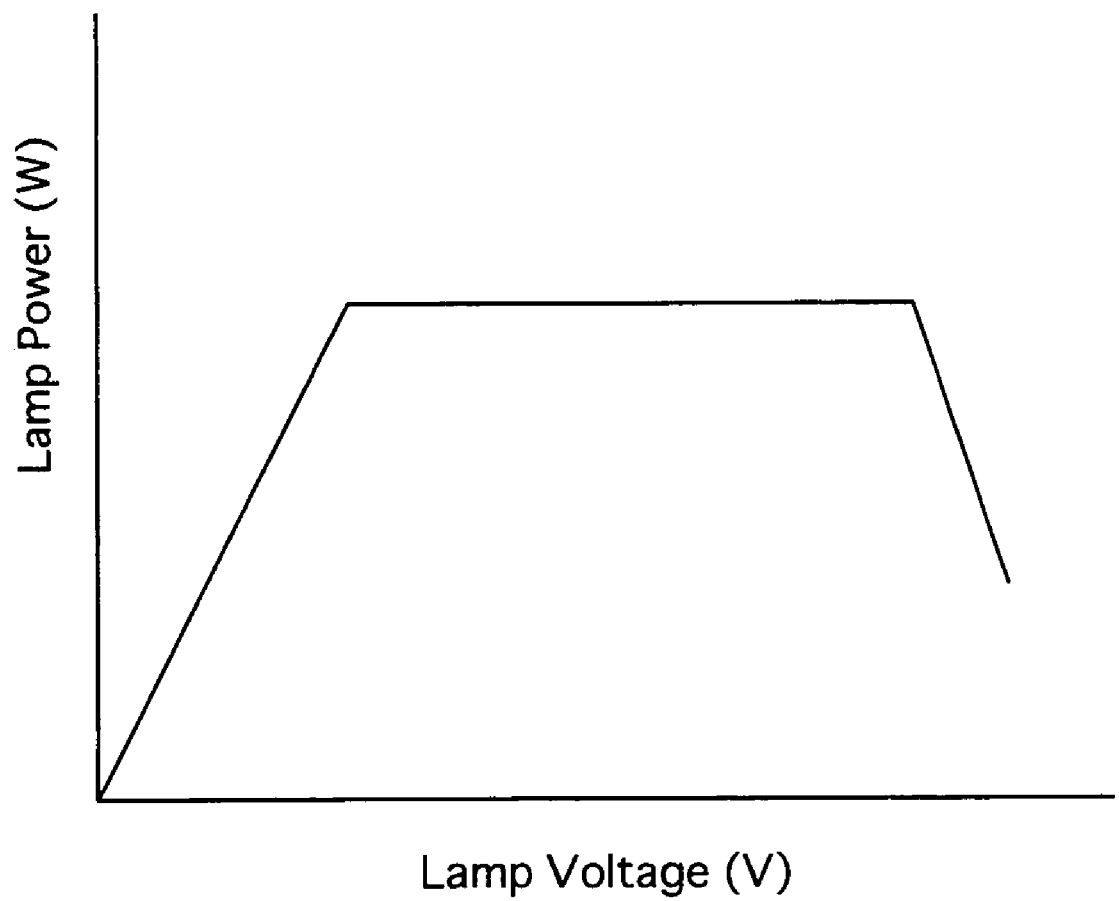
FIG. 4 illustrates the correlation between lamp voltage and lamp power.

FIG. 4 illustrates the correlation between the lamp voltage and the lamp power. The table W provides a listing of values of the lamp voltage along with corresponding values of the lamp power satisfying the correlation illustrated in FIG. 4.

One scheme to appropriately adjust the electric power supply to the lamp 1 is to adjust the durations in which the respective switching elements Q3 and Q4 are ON.

Specifically, the value of lamp voltage detected by the control unit S1 is calculated by the microcomputer through A/D converting the voltage divided by the resistors R1-R4. That is, in order to detect the lamp voltage, the absolute value of the difference between the voltage VR2 across the resistor R2 and the voltage VR4 cross resistor R4 is calculated. The thus calculated absolute value is regarded as the value of the lamp voltage.

In addition, an electronic-type lamp lighting device is normally provided with an igniter circuit for generating high-voltage pulses to start up the lamp operation. The lamp lighting device according to the present embodiment is also provided with an igniter circuit comprised of the switching elements Q1 and Q2, the inductor L2, and the capacitor C2. Even at the time of lamp start-up, it is the control unit S1 that controls ON/OFF of the switching elements Q1 and Q2 via the IC driver K1.

3. Basic Operations of Lamp Lighting Device (1) Under Normal Lamp Operation

Figure 5:
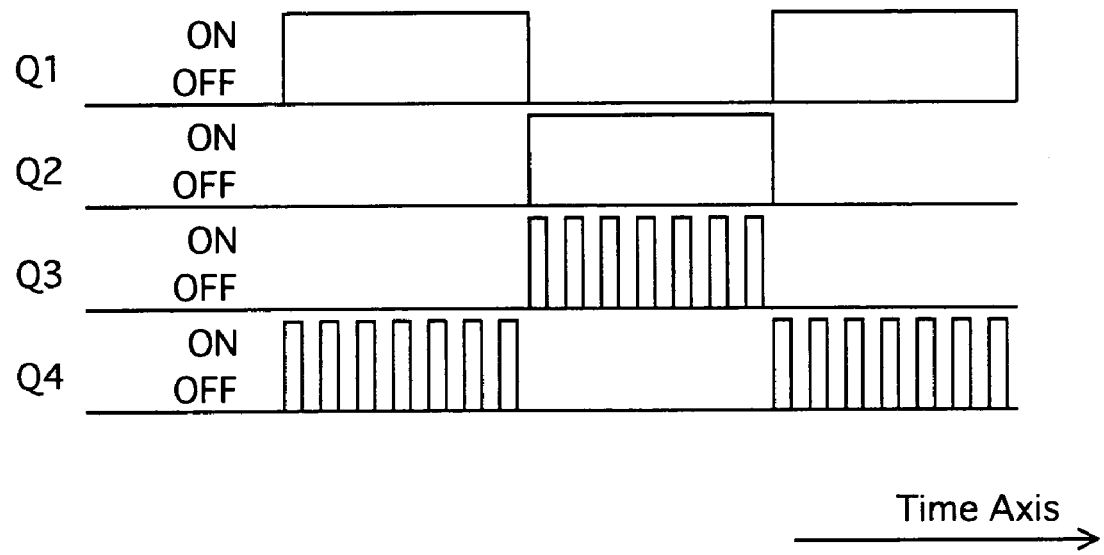
FIG. 5 is a waveform diagram for illustrating operations of the lamp lighting device under normal lamp operation.
Figure 6:
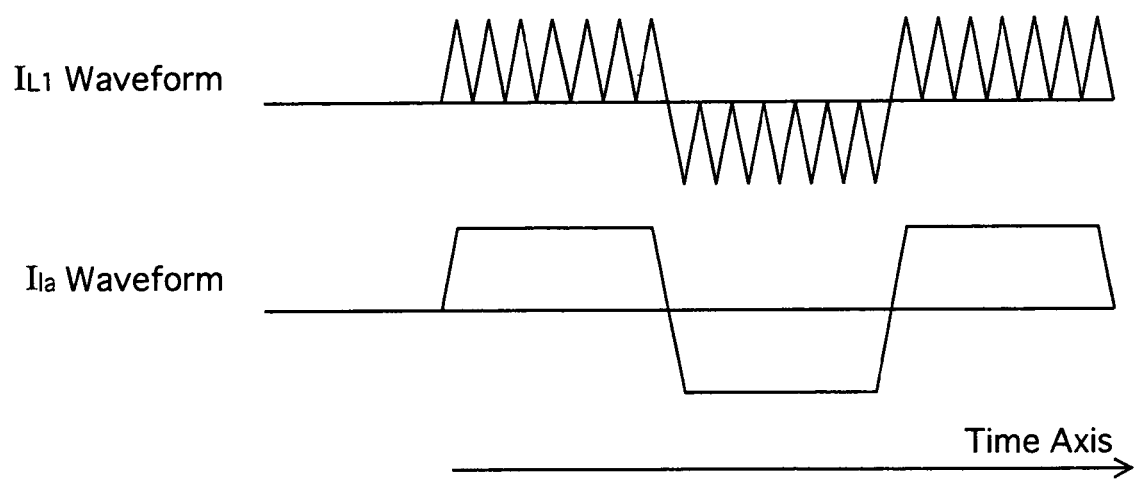
FIG. 6 is a view for illustrating operations of the lamp lighting device under normal lamp operation.

FIG. 5 is a waveform diagram for illustrating operations of the lamp lighting device under normal lamp operation. FIG. 6 is a view for illustrating operations of the lamp lighting device under normal lamp operation. Note that FIG. 5 shows the ON/OFF timing of individual switching elements Q1-Q4 during lamp operation.

First of all, the control unit S1 causes, as illustrated in FIG. 5, the switching element Q1 and Q2 to go ON/OFF at low frequencies of tens to hundreds of Hz. In addition, the control unit S1 causes the switching elements Q3 and Q4 to go ON/OFF at high frequencies of tens of kHz.

As illustrated in FIG. 6, under the control by the control unit S1, a current IL1 is supplied to the inductor L1 and the lamp La is supplied with a substantially square-wave current Ila that remains after the capacitor C removes high-frequency components from the current IL1.

As described above, the inverter circuit B is capable of two functions: one is to limit the lamp current and the other is to supply to the lamp a square-wave current resulting by removing high-frequency components.

(2) At Lamp Start-Up

At the time of start-up of the lamp, no load is imposed on the lamp. Similarly, no load is imposed on the lamp in the condition where the lamp is not connected to the output end of the lamp lighting device. These conditions are hereinafter collectively referred to as "no-load conditions". The description below is given of operations of the igniter circuit under the no-load conditions.

The serially connected inductor L2 and capacitor C2 produce resonance with application of a voltage of specific frequency f1 (constitutes a resonance circuit). Here, the frequency f1 is set within a range of tens to hundreds of kHz in view of the operational functions of the switching elements Q1 and Q2, the inductance of the inductor L2, and the capacitance of the capacitor C2.

Figure 7:
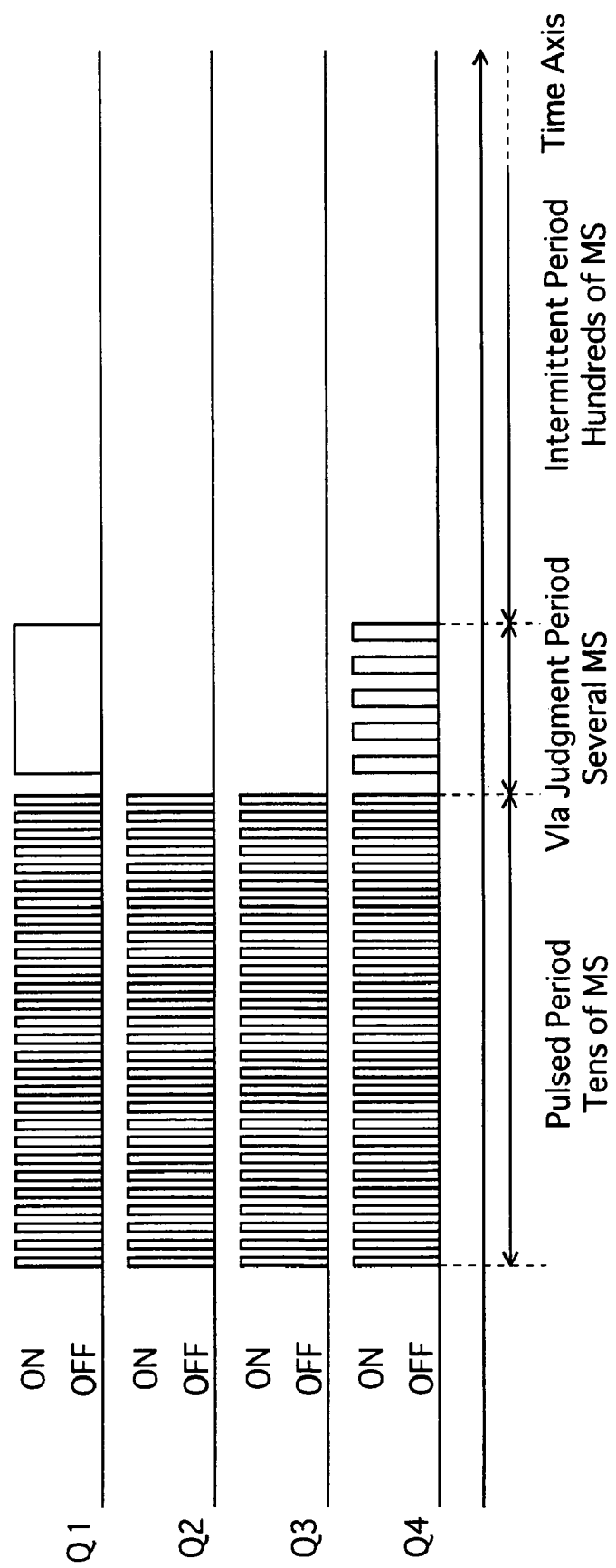
FIG. 7 is a waveform diagram for illustrating the operations of the lamp lighting device at the time of lamp start-up.

FIG. 7 is a waveform diagram for illustrating the operations of the lamp lighting device at the time of lamp start-up.

The control unit S1 turns the switching elements Q1 and Q2 ON/OFF as illustrated in the pulsed period in FIG. 7.

With this control, during the time the switching element Q1 is ON, the output voltage of the DC power circuit A is applied to the closed circuit comprised of the switching element Q1, the inductor L2, and the capacitor C2. On the other hand, during the time the switching element Q2 is ON, the capacitor C2 releases the electric charges built up during the time the switching element Q1 is ON to the closed circuit comprised of the capacitor C2, the inductor L2, and the switching element Q2.

Though the repetition of the above operations, the high-voltage resonance pulses are generated at a junction between the inductor L2 and the capacitor C2 (as shown the "pulsed period" in FIG. 7). Application of the resonance pulses to one end of the lamp La causes a dielectric breakdown between the electrodes, so that the lamp starts to operate.

Although not directly relevant to the operations of the igniter circuit, the switching elements Q3 and Q4 are controlled to operate as illustrated in FIG. 7 during the pulsed period, so as to form a current circuit-after the lamp start-up.

In addition, in order to judge whether the lamp is illuminated, a Vla judgment period is provided for the duration of half a cycle after the pulsed period of, for example, tens of ms. During the Vla judgment period, a square-wave voltage is supplied as shown in FIG. 5.

Furthermore, the igniter circuit is suspended for a period of hundreds of ms each time after continually operated for tens of ms. This period is referred to as intermittent period and provided for the sake of the start-up performance and the load imposed on the lamp electrodes.

(3) Operations of Lamp Lighting Device

Next, a description is given of operations of the lamp lighting device (i) during lamp start-up by the control unit S1, (ii) during the lamp is illuminated, and (iii) under the no-load conditions described above.

Figure 8:
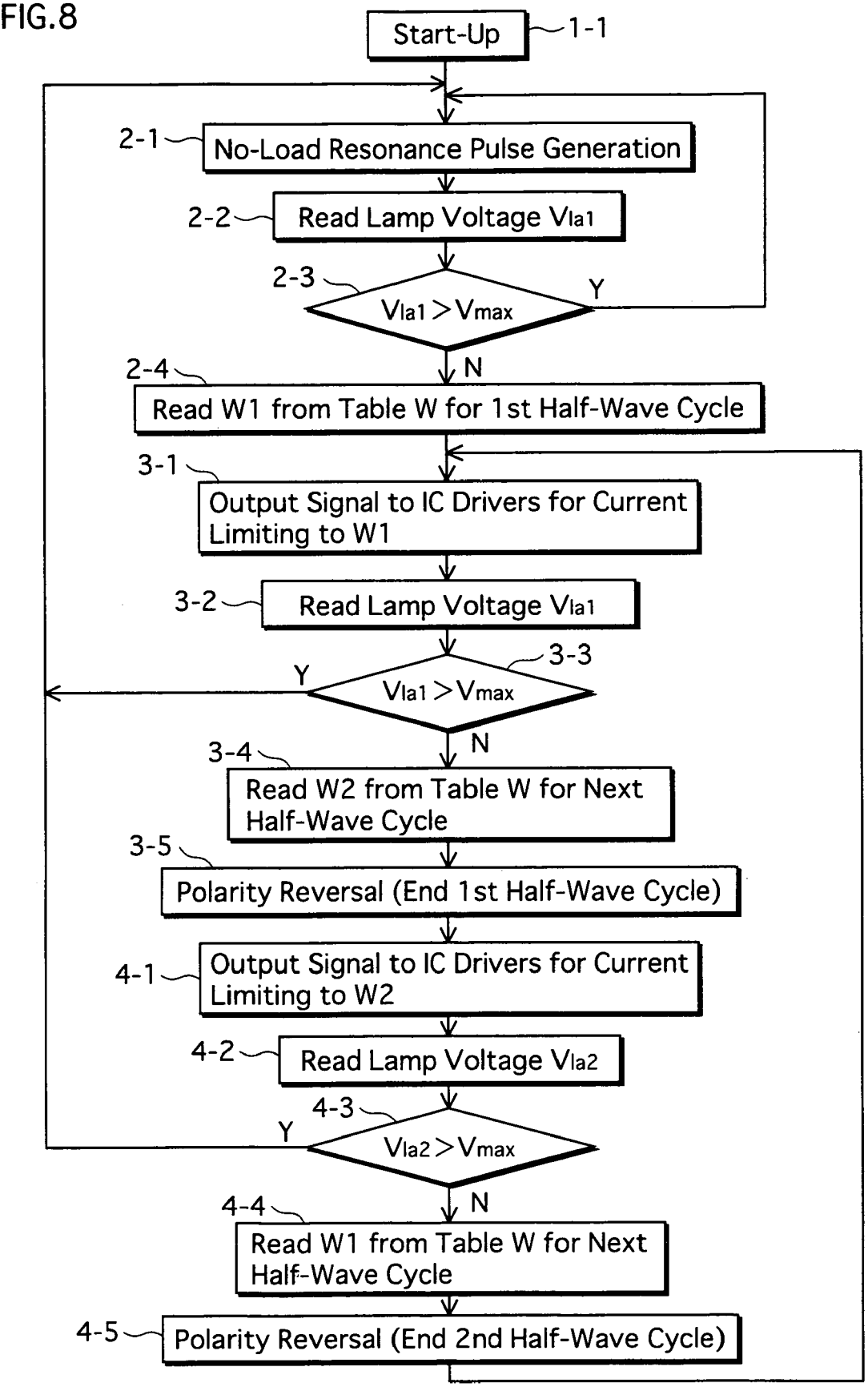
FIG. 8 is a flowchart of operations of the lamp lighting device.

FIG. 8 is a flowchart of operations of the lamp lighting device. Hereinafter, a description is given with reference to the figure.

The flow of the operations of the lamp lighting device described below covers from start-up of the lamp, which is one of the no-load conditions, to output of square-wave voltage after the lamp start-up. The flow is roughly divided into the following four stages: (1) start-up operations, (2) no-load operations, (3) first half-wave cycle operations, (4) second half-wave cycle operations. The "half-wave cycles" refers to cycles of-either of the "positive" and the "negative" phases.

First of all, the lamp lighting device is started in Step 1-1. In Step 2-1, the lamp lighting device outputs to the IC drivers K1 and K2 a signal for causing the igniter circuit to operate under the no-load conditions. That is, the control unit S1 controls ON/OFF of the switching elements Q1, Q2, Q3, and Q4 via the IC drivers K1 and K2, as illustrated in FIG. 7. As a result of the ON/OFF control, the igniter circuit generates resonance pulses and apples the pulsed voltage to the lamp La. In Step 2-2, the lamp lighting device reads the lamp voltage Vla1 based on the difference between (i) the voltage VR2 across the resistor R2 and (ii) the voltage VR4 across the resistor R4.

Upon completion of reading the lamp voltage Vla1, the lamp lighting device makes a judgment in Step 2-3 as to whether the lamp is under no-load conditions. The judgment is made by comparing the lamp voltage Vla1 with a predetermined threshold voltage Vmax. If Vla1>Vmax, it is judged that no load is imposed.

According to the lamp of the present embodiment, the lamp voltage Vla during normal operation is set to be 90 V, for example. Naturally, the lamp voltage Vla under the no-load conditions is higher than 90 V. In view of this, the threshold voltage Vmax is set to a value that is higher than the lamp voltage during normal operation and lower than the lamp voltage under the no-load conditions. With the threshold voltage Vmax, a judgment as to whether the lamp is under the no-load conditions is made based on the lamp voltage.

The value of the threshold voltage Vmax may be determined with reference to the lamp voltage measured during the glow discharge that occurs at the time of illumination start. In the case of the lamp according to the present embodiment, the lamp voltage Vla during the glow discharge is within a range of 250-350 V. Thus, the threshold voltage Vmax is preferably 2.5 to 4 times the lamp voltage during normal operation.

If it is judged that the lamp is under the no-load conditions (Step 2-3: Y), it means that the lamp La has not yet been started (illuminated). Thus, Step 2-1 is performed again. On the other hand, if it is judged that the lamp is no longer in the no-load conditions (Step 2-3: N), it means that the lamp has started. Thus, Step 2-4 is performed next.

In Step 2-4, the lamp lighting device reads, from the table W, the value for immediately after the lamp start-up and sets a current limiting target W1 to be achieved during a first half-wave cycle.

In Step 3-1, the lamp lighting device output appropriate signals in accordance with the set current limiting target W1 to the IC drivers K1 and K2. For example, the signals are to adjust the ON duration of the respective switching elements. While supplying the output signals, the lamp lighting device reads, in Step 3-2, the current lamp voltage as the lamp voltage Vla1.

Next, in Step 3-3, similarly to Step 2-3, a judgment is made as to whether the lamp is under the no-load conditions. If it is judged that the lamp is under the no-load conditions due to fading out of discharge (Step 3-3: Y), Step 2-1 is performed again to re-illuminate the lamp. If the lamp stays illuminated (Step 3-3: N), Step 3-4 is performed next.

In Step 3-4, the lamp lighting device reads, from the table W, a current limiting target W2 for the next (second) half-wave cycle. The lamp voltage applied during the first half-wave cycle is opposite in polarity to the lamp voltage applied during a subsequent second half-wave cycle. Thus, with reference to the polarity of the currently applied lamp voltage, it is readily judged that the subsequent half-wave cycle is either a first or second half-wave cycle (in this example, the next half-wave cycle is the second half-wave cycle). The lamp lighting device reads, from the table W, the value for either the first or second half-wave cycle judged to be the next half-wave cycle. Note that the same table W is commonly used for both the first and second half-wave cycles.

In Step 3-5, the lamp lighting device finishes the first half-wave cycle and outputs a signal for reversing the polarity to the IC drivers K1 and K2. More specifically, the control unit S1 suspends the ON operation of the switching element Q1 and the ON/OFF operation of the switching element Q4. In addition, the control unit S1 outputs signals via the IC drivers K1 and K2 to cause the switching element Q2 to be ON and the switching element Q3 to be ON/OFF.

In Step 4-1, the lamp lighting device outputs, to the IC drivers K1 and K2, a signal responsive to the current limiting target W2 read from the table W in Step 3-4. At the same time, the lamp lighting device reads the lamp voltage Vla2 in Step 4-2.

In Step 4-3, similarly to Steps 2-3 and 3-3, a judgment is made as to whether the lamp is under the no-load conditions, based on whether Vla2>Vmax is satisfied. If it is judged that the lamp is under the no-load conditions because of, for example, fading-out of discharge (step 4-3: Y), Step 2-1 is performed next. If the lamp stays illuminated (Step 4-3: N), Step 4-4 is performed next.

In Step 4-4, the lamp lighting device reads, from the table W, the current limiting target W1 corresponding to the Vla2 for the next (first) first half-wave cycle and makes the setting accordingly. As already described above, whether the next half-wave cycle is a first or second half-wave cycle is judged based on the polarity of the lamp voltage Vla2 read in Step 4-2.

In Step 4-5, the lamp lighting device finishes the second half-wave cycle, and outputs, to the IC driver K1 and K2, a signal for reversing the polarity. Then, Step 3-1 is performed again to repeat the above-described operating steps.

4. Characteristics of Outer-Tube Discharge State

According to the present invention, occurrence of an outer-tube discharge state is detected. In addition, occurrence of a state indicating that an outer-tube discharge is imminent is also detected. Such states often occur at the end of useful life of the lamp. On detecting any of these states, the lamp lighting device suspends or reduces the power supply to the lamp.

Note that the term "outer-tube discharge, etc." may be used to collectively refer to an outer-tube discharge and a discharge occurring immediately before an outer-tube discharge. Similarly, the term "outer-tube discharge state, etc." may be used to collectively refer to the state of an outer-tube discharge and the state preceding an outer-tube discharge.

Now, a description is given of characteristics of the outer-tube discharge state, etc.

Figure 9A:
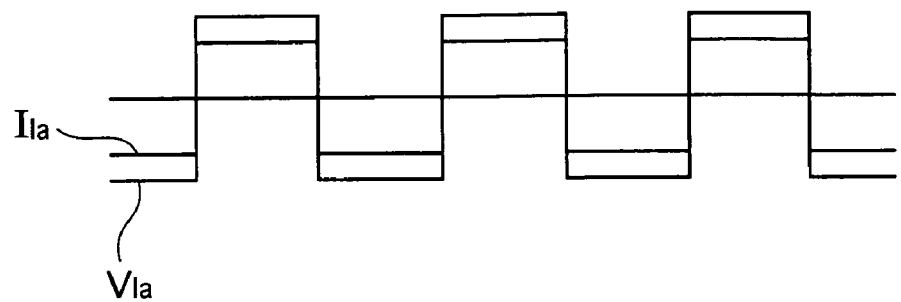
FIG. 9 schematically illustrate the waveforms of lamp characteristics in an outer-tube discharge state and in a state preceding the outer-tube discharge state.

For the purpose of comparison with the waveforms measured during an outer-tube discharge, FIG. 9A illustrates the waveforms of the lamp voltage and the lamp current measured during normal operation of the lamp which has not yet reached the end of its useful life.

Figure 9B:
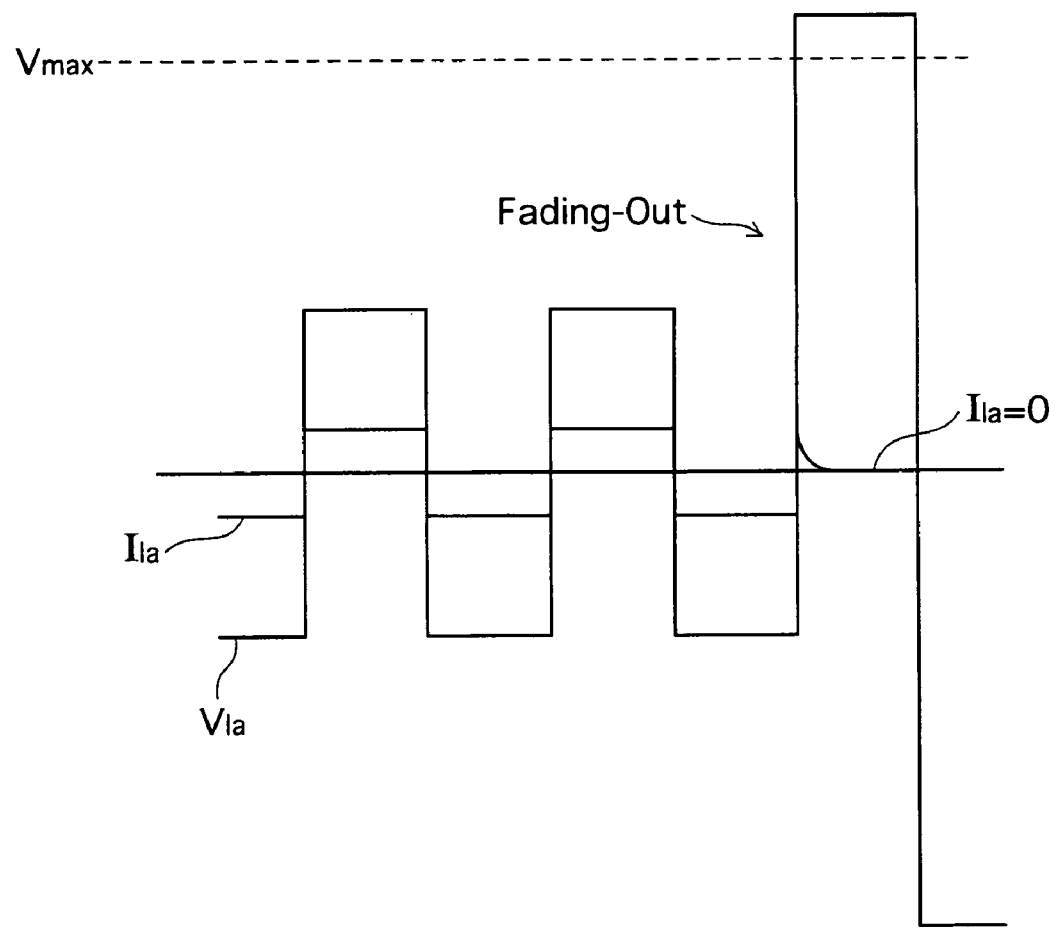

FIG. 9B illustrates the waveforms of the lamp voltage and the lamp current in one state that occurs at the end of useful life. In this state, an outer-tube discharge has not yet occurred and fading-out of discharge is detected by detecting the lamp is under the no-load conditions.

Note that the state illustrated in FIG. 9B is the state preceding an outer-tube discharge. In FIGS. 9A and 9B, the vertical direction represents either the voltage values or the current values, whereas the lateral direction represents the passage of time.

The characteristics of a discharge under this state are that no current flows as a result of fading-out of the lamp and thus the lamp voltage rises abruptly. In terms of the electrical properties, the lamp voltage rises abruptly and the lamp current drops to approximately "0" as a result of the fading-out.

FIGS. 10, 11, and 13 are diagrams showing the waveforms of the lamp voltage and the lamp current measured during an outer-tube discharge.

The waveforms of the lamp voltage and the lamp current shown in the diagrams were measured under the state where the arc tube of a lamp was damaged for some reason and an outer-tube discharge occurred thereafter.

Note that the waveforms of the lamp voltage Vla and the lamp current Ila shown in the diagrams were measured at the output end of testing ballasts. The lamp samples used in the testing were CDM-T150W lamps manufactured by Philips Electronics. The ballast samples used in the testing were square-wave ballasts (MHC1501/24CK-2E Manufactured by Matsushita Electric Works, Ltd.)

Figure 10A:
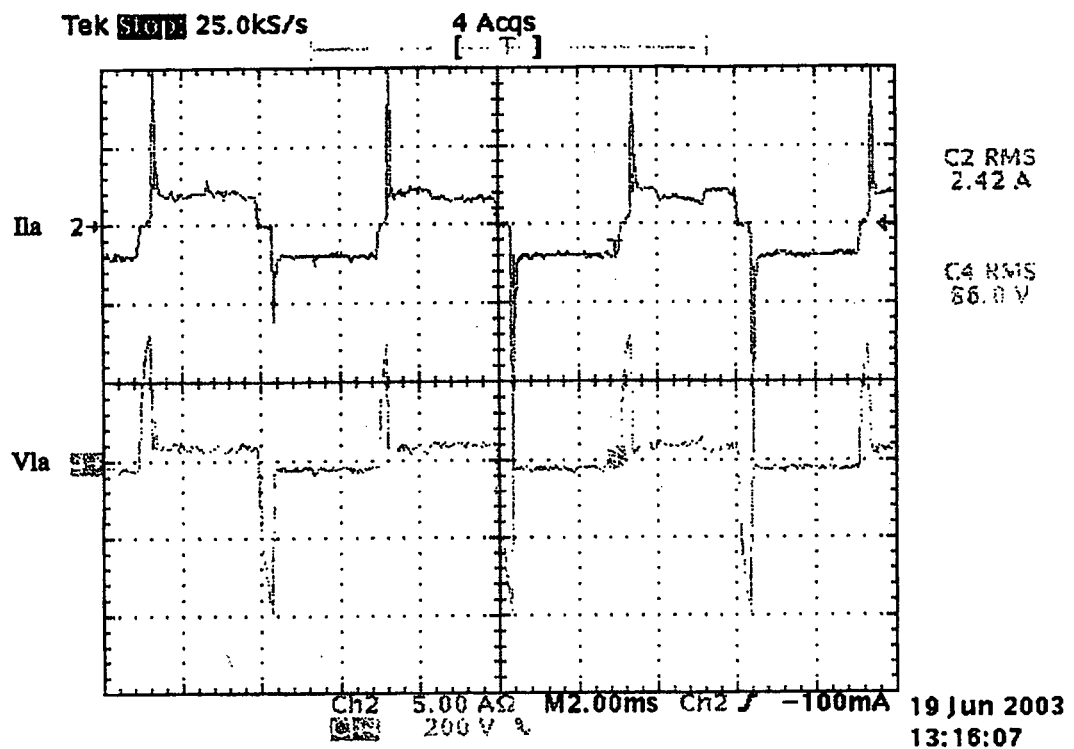
FIG. 10 illustrate the waveforms of lamp voltage and lamp current measured during an outer-tube discharge.
Figure 10B:
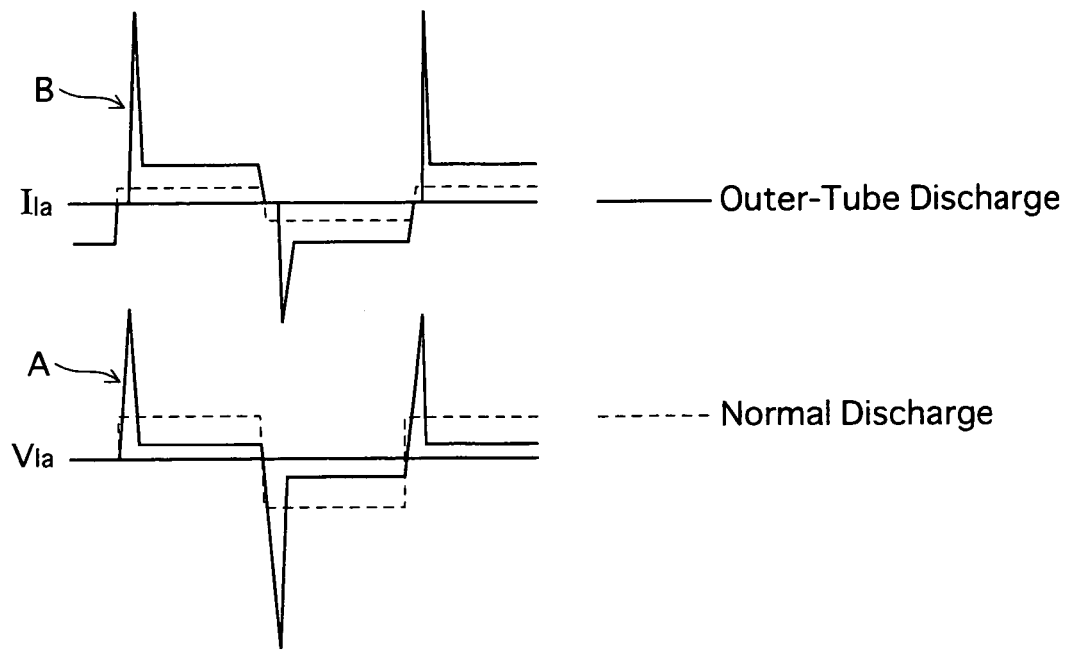
Figure 11A:
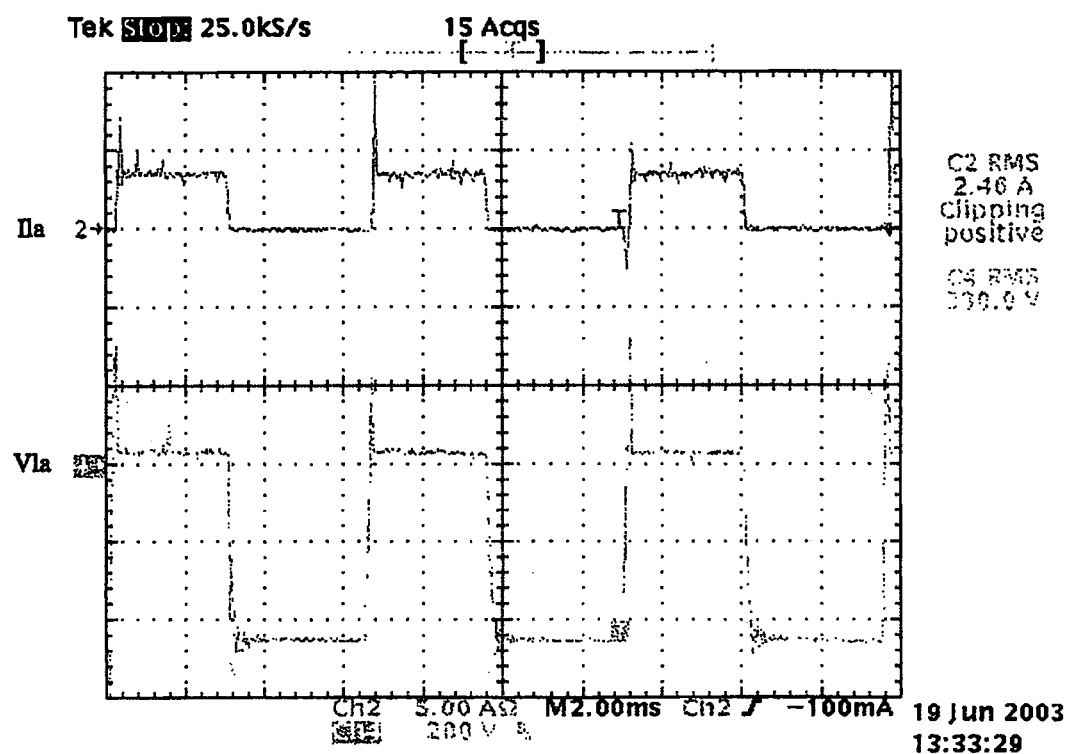
FIG. 11 illustrate the waveforms of lamp voltage and lamp current measured during an outer-tube discharge.
Figure 11B:
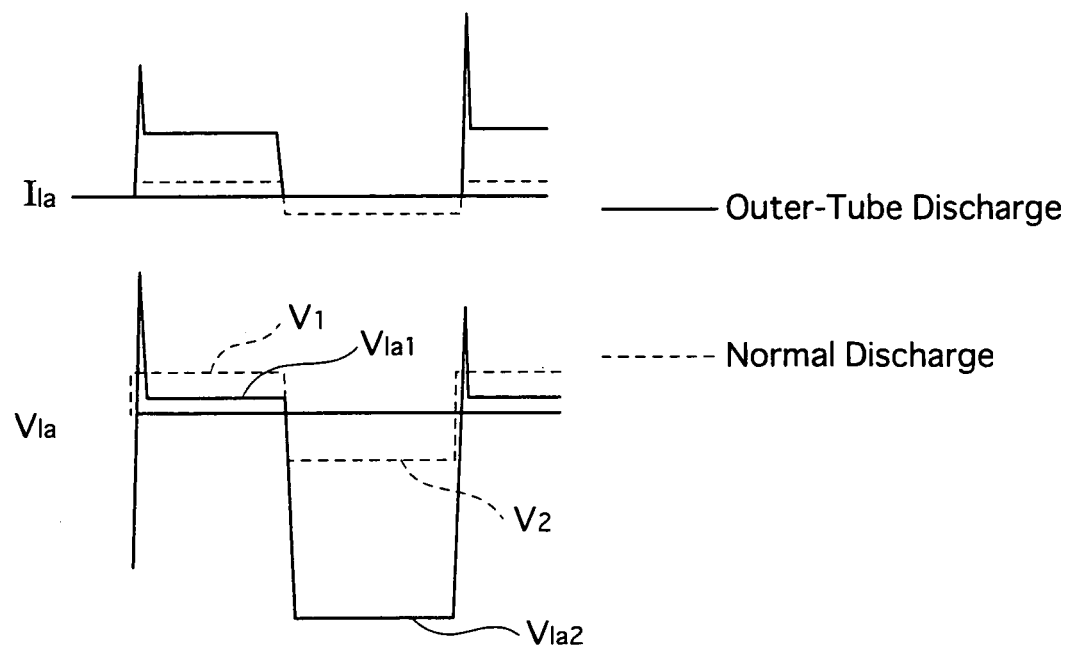
Figure 13A:
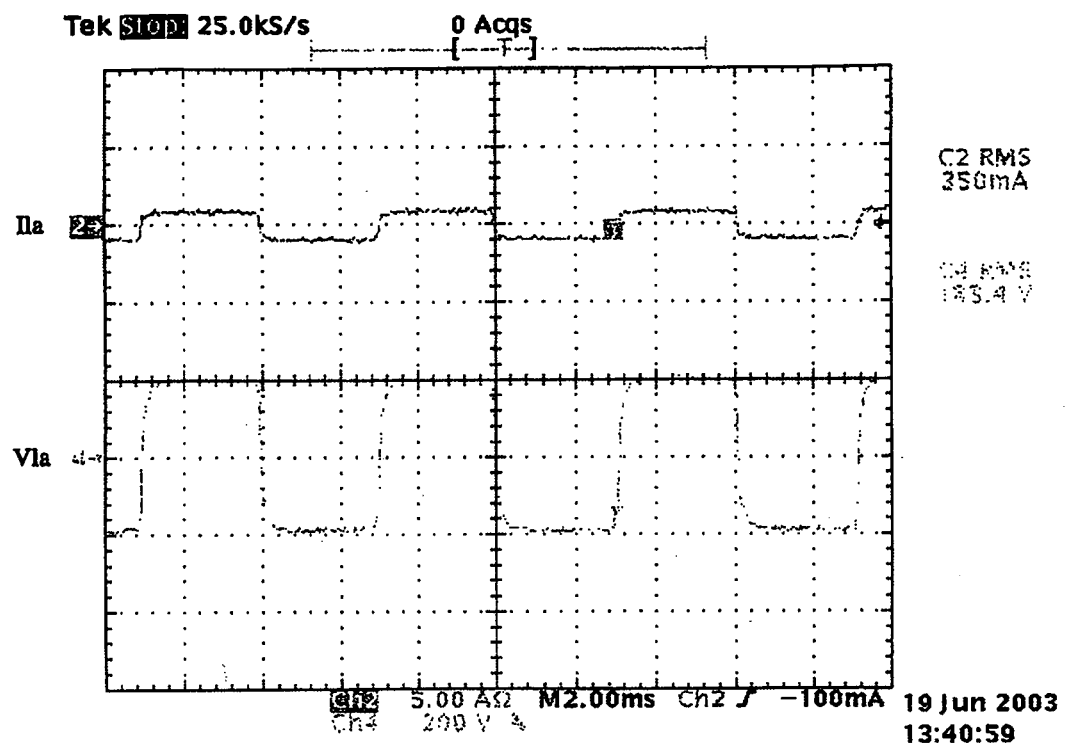
FIG. 13 illustrate the waveforms of lamp voltage and lamp current measured during an outer-tube discharge.
Figure 13B:
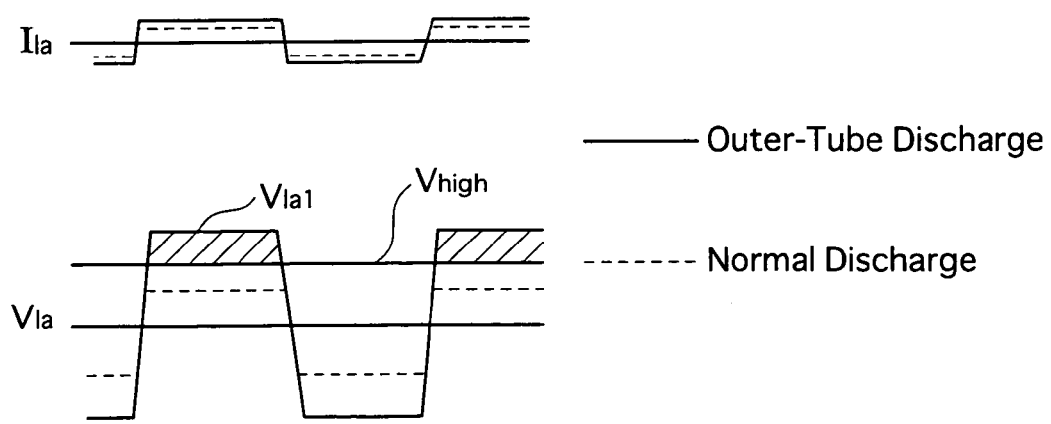

Note that the waveforms shown in FIGS. 10A, FIG. 11A, and FIG. 13A are of the lamp voltage and lamp current actually measured. FIG. 10B, FIG. 11B, and FIG. 13B are schematic diagrams of the waveforms shown in FIG. 10A, FIG. 11A, and FIG. 13A, respectively. The dotted lines in the schematic diagrams represent the waveforms of the lamp voltage and lamp current measured during normal lamp operation.

The characteristics shown in FIG. 10 are that the outer-tube discharge is not easily stabilized. In terms of the electrical properties, the lamp voltage exhibits a sharp rise immediately after polarity reversal (so-called "re-ignition voltage" denoted in FIG. 10B with the reference numeral "A"). In addition, the lamp current also exhibits a sharp rise upon disappearance of the re-ignition voltage that occurred immediately after the polarity reversal (so-called "overshoot current" labeled as "B" in FIG. 10B)

Note that the outer-tube discharge is unstable as described above. Yet, the state shown in FIG. 10 is relatively stable. In the phase following this relatively stable phase, fading-out of the outer-tube discharge and re-startup are repeated.

FIG. 11 show the characteristics of the outer-tube discharge that a half-wave discharge is occurring within the lamp. The half-wave discharge tends to continue for a longer duration as compared with the state shown in FIG. 10 in which fading-out occurs. In terms of the electrical property, for example, the lamp current Ila is substantially equal to "0" during half-wave cycles of one of the positive or negative polarities. In another example, the lamp voltage during half-wave cycles of either polarity is higher than the lamp voltage during half-wave cycles of the other polarity.

The description below is made with reference to FIGS. 11. As illustrated in FIG. 11B, during a full-wave discharge, the lamp voltage values (labeled as "V1" and "V2" in the figure) in half-wave cycles of the respective polarities are substantially equal to each other. On the other hand, during a half-wave discharge, the lamp voltage values in half-wave cycles of the respective polarities (denoted with the reference numerals "Vla1" and "Vla2" in the figure) differ greatly.

In addition to the characteristics described above, the lamp voltage shown in FIGS. 10 and 11 tends to fluctuate widely, rater than remain at a constant level.

Figure 12:
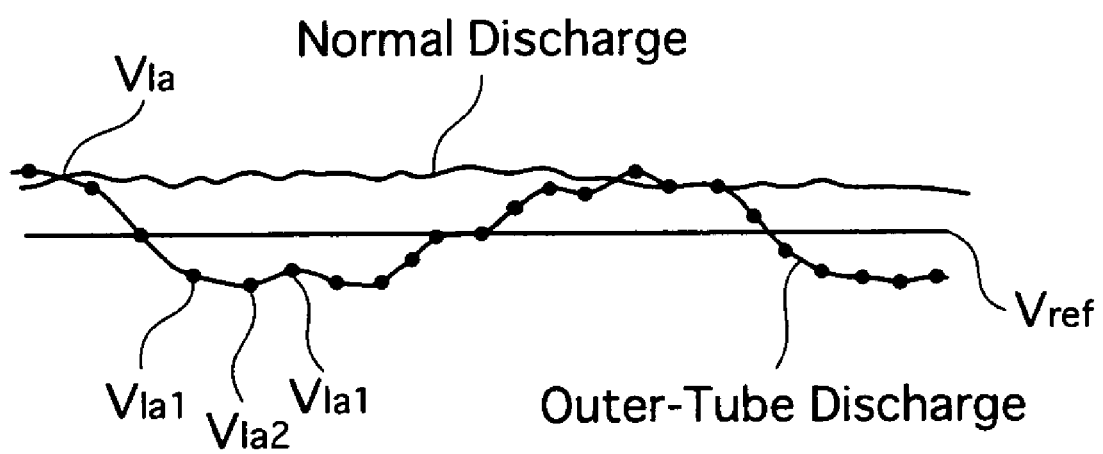
FIG. 12 illustrates fluctuations in lamp voltage.

FIG. 12 illustrates the fluctuations of the lamp voltage.

FIG. 12 is, for example, a plot of the lamp voltage values (absolute values) measured every half-wave cycle. The figure also shows the lamp voltage during normal operation. As illustrated, during normal lamp operation, the lamp voltage stays at a relatively high level with little fluctuations (labeled as "Normal Discharge" in the figure) Contrary, the lamp voltage fluctuates widely during an outer-tube discharge (labeled as "Outer-Tube Discharge" in the figure). That is, it was observed that an outer-tube discharge was not very stable but somehow continued and that the lamp voltage during the outer-tube discharge fluctuated up and down. The term "up and down" means that the values of the lamp voltage or lamp current increases and decreases.

FIG. 13 show the characteristic that an outer-tube discharge occurred at the root of the lamp between two closest locations of opposite polarities and that the discharge stably continues.

In terms of the electrical property of such a stable outer-tube discharge, neither the lamp voltage nor the lamp current exhibits abrupt changes as in FIGS. 10 and 11. The lamp voltage during this outer-tube discharge is higher (180 V, for example) than a nominal lamp voltage (which is 90 V, in the present embodiment).

That is, in the state shown in FIG. 13, the lamp voltage or lamp current exhibits a waveform similar to the voltage waveform during normal operation. Yet, the arc discharge stabilizes and continues with the voltage and current values that are different from the values measured during normal operation. Note in this state, no fading-out of discharge occurs.

5. Characteristics in Operations of Lamp Lighting Device

The control unit S1 of the lamp lighting device exhibits specific phenomena described above (FIGS. 9-13) during an outer-tube discharge. In view of these phenomena, it is judged that an outer-tube discharge is occurring if detection results exhibit an electrical property specific to any of such phenomena. On judging that outer-tube discharge is occurring, a power supply to the lamp is shut down.

That is, the control unit S1 is so structured to perform operating steps, in addition to the flowchart shown in FIG. 8, to detect an outer-tube discharge state or a state indicating that an outer-tube discharge is imminent (such a state is referred to as the "preceding state". Upon detecting an outer-tube discharge state or the preceding state, the control unit S1 suspends the circuit operation or reduces the electric power output.

The detection of an outer-tube discharge state etc. is carried out, for example, in the following schemes.

a. The lamp lighting device is provided with a detecting unit for detecting the value of a lamp voltage or a lamp current, and a counting unit for counting the number of times of discharge fading-out occurrences. It is judged that the discharge is in the outer-tube discharge state etc. when the count of fading-out occurrences exceeds a predetermined count. (This scheme corresponds to Example 1, which will be described later.)

b. The lamp lighting device is provided with a detecting unit for detecting the value of a lamp voltage or a lamp current, and a counting unit for counting the number of times that the detected value fluctuates beyond a predetermined judgment criterion. It is judged that the discharge is in the outer-tube discharge state etc. when the count exceeds a predetermined-count. (This scheme corresponds to Example 2, which will be described later.)

c. The lamp lighting device is provided with a detecting unit for detecting the value of a lamp voltage or a lamp current, and a counting unit for counting the number of times of or the duration of a half-wave discharge. It is judged that the discharge is in the outer-tube discharge state etc. when the count or the duration exceeds a predetermined threshold. (This scheme corresponds to Example 3, which will be described later.)

d. The lamp lighting device is provided with a detecting unit for detecting the value of a lamp voltage or a lamp current, and a counting unit for counting the number of times or a duration of time that the detected value is blow a predetermined lower limit (or above a predetermined upper limit). It is judged that the discharge is in the outer-tube discharge state etc. when the count or the duration exceeds a predetermined threshold. (This scheme corresponds to Example 4, which will be described later.)

e. The lamp lighting device is provided with a detecting unit for detecting the value of a lamp voltage or a lamp current, and a counting unit for courting, based on the detection result, the number of times that the electrical property changes abruptly after polarity reversal. It is judged that the discharge is in the outer-tube discharge state etc. when the counted number exceeds a predetermined threshold. (This scheme corresponds to Examples 6 and 7).

Hereinafter, specific operations of the control unit are described by way of Examples relating to the specific phenomena described above.

Note that the control unit S1 in each Example is provided with: a detecting unit for detecting the electrical property of the lamp 1; a judging unit for judging whether the discharge is in the outer-tube discharge state etc., based on the detected electrical property (which is equivalent to the detected electrical property recited in the present invention); and a instructing unit for instructing to suspend the lighting operation when it is judged that the currently occurring discharge is in the outer-tube discharge state etc.

(1) EXAMPLE 1

In Example 1, the circuit operation is suspended in the state where the lamp is at the end of useful life and fading-out occurs repeatedly. This state is illustrated in FIG. 9.

In Example 1, changes in electrical property of the lamp resulting from fading-out a reactively detected. More specifically, the control unit S1 is capable of counting the number of times that fading-out occurs after the lamp start-up, and suspending the lighting operation if the count reaches a predetermined count.

More specifically, the detecting unit detests the lamp voltage Vla shown in FIG. 3. Similarly to the judgment made in Step 2-3 shown in FIG. 8, the judging unit judges based on the value of lamp voltage Vla whether the lamp is under the no-load conditions. Each time it is judged that the lamp is under the no-load conditions, i.e., fading-out has occurred, the judging unit counts up the occurrence number of fading-out. If the count reaches a predetermined count, the judging unit judges that the lamp is in the state preceding the outer-tube discharge state. Thus, the instructing unit outputs OFF signals to the switching elements Q1-Q4.

Now, a description is given of the operations according to Example 1.

Figure 14:
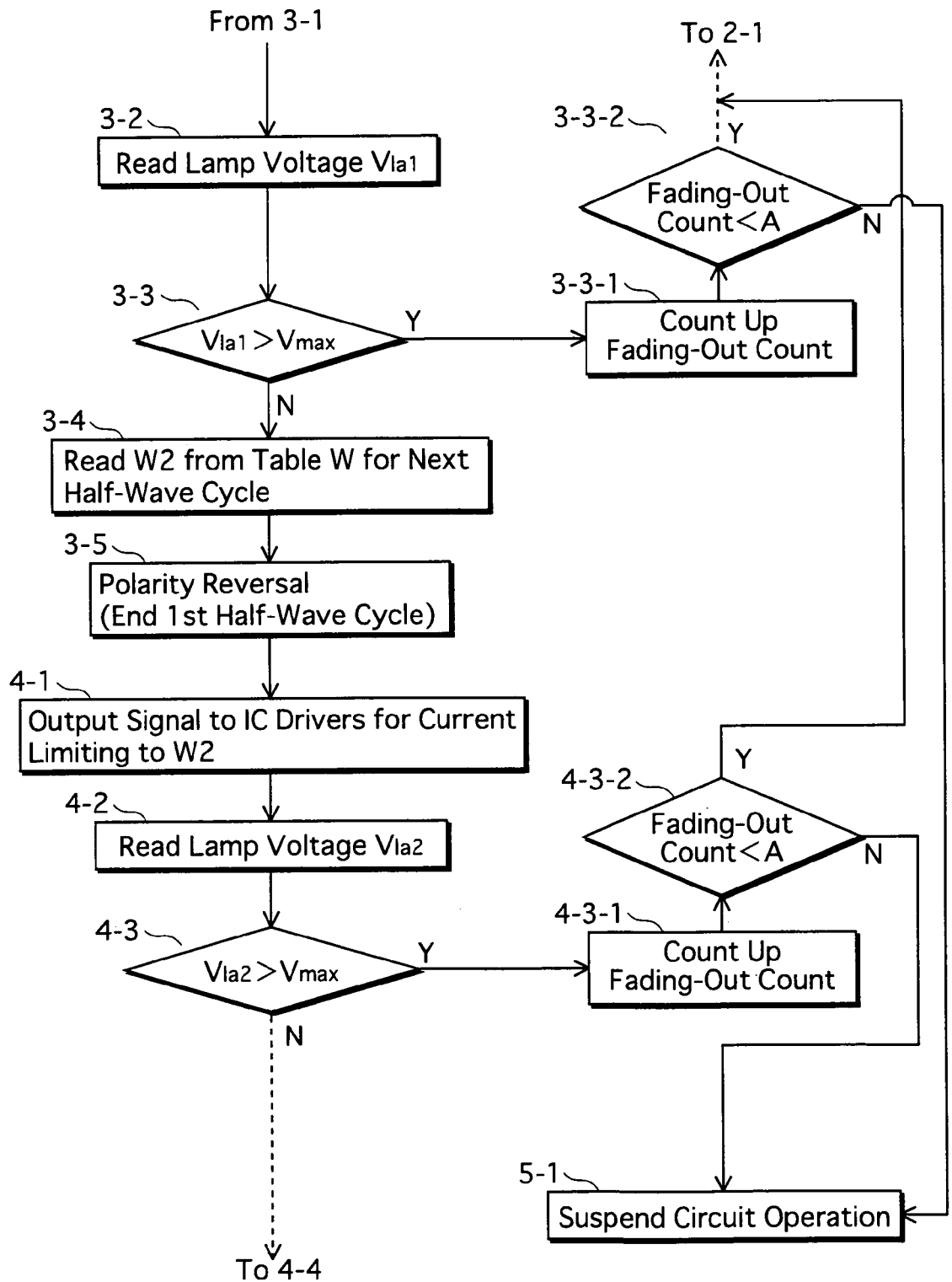
FIG. 14 is a -flowchart of operating steps performed by the lamp lighting device according to Example 1.

FIG. 14 is a flowchart of operating steps performed by the lamp lighting device according to Example 1.

The flowchart shown in FIG. 14 is basically identical to the flowchart shown in FIG. 8, with the addition of operating steps of judging whether the currently occurring discharge is in the state preceding the outer-tube discharge state described above. In FIG. 14, the same reference numerals are used to denote Steps identical to those shown in FIG. 8.

In Step 3-3 or Step 4-3 shown in FIG. 8, a judgment is made as to whether the lamp is under no-load conditions. If the judgment results in "Yes", the count of fading-out occurrences is incremented by "1". If the count reaches a predetermined count A, the control unit suspends the circuit operation by, for example, outputting to the IC drivers K1 and K2 signals causing the switching elements Q1-Q4 to stay OFF.

More specifically, as illustrated in FIG. 14, if it is judged in Step 3-3 that the lamp is under no-load conditions (Step 3-3: Y), the count of fading-out occurrences is counted up in Step 3-3-1. In Step 3-3-2, if it is judged that the count of fading-out occurrences is less than the predetermined count A (Step 3-3-2: Y), Step 2-1 shown in FIG. 8 is performed next. On the other hand, if it is judged in Step 3-3-2 the count of fading-out occurrences has reached the predetermined count A (20 times, for example) (Step 3-3-2: N), it is judged that the lamp is in the state preceding the outer-tube discharge state. Then, in Step 5-1, the circuit operation is suspended (switching elements are instructed to be OFF).

If it is judged in Step 4-3 that the lamp is under no-load-conditions (Step 4-3: Y), the count of fading-out occurrences is counted up in Step 4-3-1. If it is judged in Step 4-3-2 that the count of fading-out occurrences is less than the predetermined count A (Step 4-3-2: Y) . Step 2-1 shown in FIG. 8 is performed next. On the other hand, if it is judged in Step 4-3-2 that the count of fading-out occurrences has reached the predetermined count A (Step 4-3-2: N), it is judged that the lamp is in the state preceding the outer-tube discharge state. Then, the circuit operation is suspended in Step 5-1.

Here, the count of fading-out occurrences kept in Steps 3-3-1 and 4-3-1 are the same count, rather than two separate counts. In addition, the predetermined count A in Example 1 is "20" times but without limitation. For example, the predetermined count A may be 10 times. That is, the predetermined count A is determined suitably in view of, for example, the rated power, property, and size of the lamp. In the case of a small-sized lamp, the distance to the base from a location of an outer-tube discharge would be inevitably shorter as compared with the case of a larger sized lamp. Thus, the heat conducts more easily. In view of this, it is desirable that the predetermined count A should be of a smaller value. In the case of a lamp with a smaller power supply, the amount of heat generated by the discharge is normally smaller. Thus, the predetermined count A should be of a larger value.

(2) EXAMPLE 2

In Example 2, the control unit suspends the circuit operation upon detecting that the lamp voltage fluctuates. That is, the circuit operation is suspended when the waveform is as shown in FIGS. 10 and 11 and the lamp voltage values plotted each half-wave cycle is shown in FIG. 12.

More specifically, after the lamp start-up, the control unit S1 reads the lamp voltage Vla1. Suppose that the initial value of the lamp voltage Vla1 read in either in the first or second half-wave cycle exceeds a threshold Vref1 (which is equivalent to the reference level recited in the present invention). If the value the of lamp voltage Vla2 or Vla1 subsequently read is below the threshold Vref1, the control unit S1 counts up the count of Vla fluctuations. The operation of the lamp lighting device is suspended when the Vla fluctuation count reaches a predetermined number.

More specifically, for example, the judging unit counts up each time the detected voltage Vla fluctuates beyond or below the threshold Vref1. When the Vla fluctuation count reaches a predetermined count B, the judging unit judges that the discharge is in the outer-tube discharge state etc. In response to this judgment, the instructing unit outputs OFF signals to the switching elements.

Now, a description is given of the operation performed according to Example 2. Note that the threshold Vref1 described above corresponds to Vref shown in FIG. 12.

Figure 15:
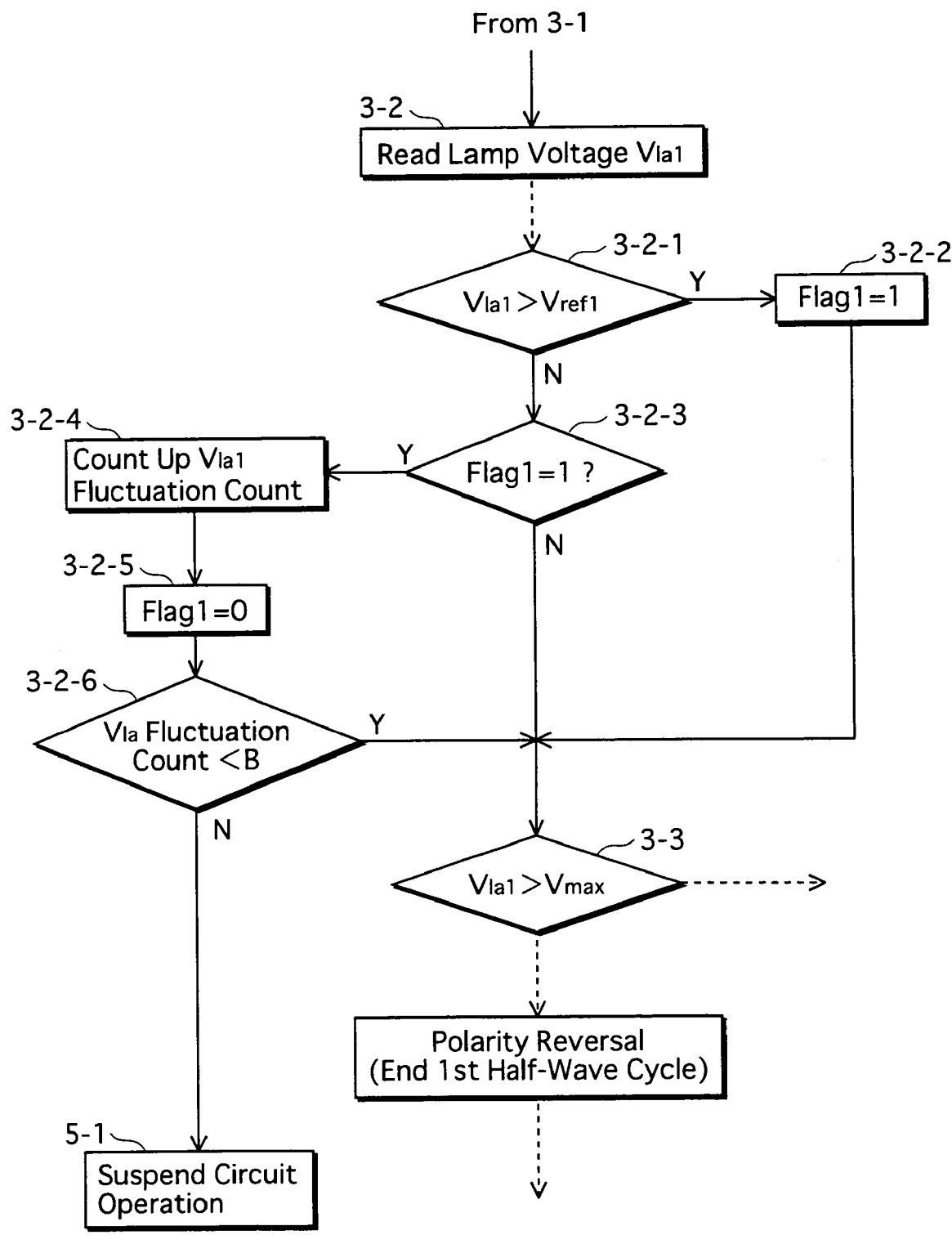
FIG. 15 is a flowchart of operating steps performed by the lamp lighting device according to Example 2.

FIG. 15 is a flowchart of-operating steps performed by the lamp lighting device the according to Example 2.

The control unit S1 additionally performs a step of counting up the Vla fluctuation count each time the lamp voltage Vla1 detected in the first half-wave cycle fluctuates above or below the threshold Vref. When the Vla fluctuation count reaches the predetermined count B, the control unit S1 performs-a step of suspending the power supply. The above steps are performed somewhere between Steps 3-2 and 3-5 shown in FIG. 8. That is, the additional steps described above are additionally performed anywhere between Steps 3-2 and 3-5, such as between Steps 3-2 and 3-3 or between Steps 3-4 and 3-5.

As described above, it is not necessary to perform the additional steps described above at any specific timing as long as they are performed between Steps 3-2 and 3-5. For this reason, FIG. 15 illustrates arrows connecting Steps 3-2 to 3-2-1 and Steps 3-3 to Step 3-5 with dotted lines.

In addition, it is applicable to add the above steps only to operation relating to the second half-wave cycles. That is, the above steps maybe added anywhere between Steps 4-2 nd 4-5 shown in FIG. 8. This arrangement still achieves the advantageous effect described above. In addition, if the above-described steps are added to both the operations relating to the first and second half-wave cycles, further accuracy is ensured in detection of the lamp voltage fluctuations.

Specifically, as illustrated in FIG. 15, the lamp voltage Vla1 read in Step 3-2 is compared in Step 3-2-1 with the threshold Vref1 (55 V, for example). If Vla1 >Vref1 (Step S3-2-1: Y), Flag1 is set to "1" (Step 3-2-2) and Step 3-3 is performed next.

Upon completion of a second half-wave cycle, the lamp voltage Vla1 detect in a subsequent first half-wave cycle is compared in Step 3-2-1 with the threshold Vref1. If not Vla1 >Vref1, i.e., if Vla1 ≦Vref1 (Step 3-2-1: N), it is further judged in Step 3-2-3 whether Flag1 =1.

If Flag1=1 (Step S3-2-3: Y), it means that the lamp voltage Vla1 rises beyond or drops below the threshold Vref1. Thus, the Vla fluctuation count counted up (Step 3-2-4) and Flag1 is reset to "0" (Step 3-2-5).

If it is judged in Step 3-2-6 that the Vla1 fluctuation count has reached the predetermined count B (60 times, for example) (i.e. if it is jugged that Vla1 fluctuation count <B is not true) (Step 3-2-6: N), Step 5-1 is performed next, so that the circuit operation is suspended.

With the structure described above, it is ensured that the lamp lighting device detects the fluctuations in lamp voltage Vla1 as typified by FIGS. 10 and 11, which are observed when an outer-tube discharge occurs and continues although not stable. Consequently, the state of outer-tube discharge, etc is detected.

In this description, the threshold Vref1 is 55 V but without limitation thereto, and may alternatively be 60 V, for example. That is, the threshold Vref1 may be appropriately set in view of the lamp voltage values measured during an outer-tube discharge. The lamp voltage varies based on various factors, such as the length of power supply lines and the lamp voltage applied under normal lamp operation. In other words, it is applicable to set the threshold Vref1 with reference to the properties of the actual lamp.

In addition, the threshold count B of the Vla fluctuations is not limited to 60 times. It is applicable to determine the count B suitably in view of the design characteristics of the lamp, such as electrodes and filling.

(3) EXAMPLE 3

According to Example 3, the circuit operation is suspended if an outer-tube discharge continues in the state of a half-wave discharge, i.e., in the state where the lamp current Ila is as shown in FIG. 11 (In FIG. 11A, the lamp current Ila is approximately equal to zero during the half-wave cycles of one polarity. In FIG. 11B, the lamp voltage of the half-wave cycles of one polarity (Vla2) is higher than the lamp voltage of the half-wave cycles of the other polarity (Vla1)). In other words, in Example 3, occurrences of a half-wave discharge are counted. The circuit operation is suspended when the half-wave discharge count reaches a predetermined count.

More specifically, for example, the judging unit makes the following judgment in view of the characteristics of a half-wave discharge that the lamp voltage during the half-wave cycles of one polarity tends to higher than the lamp voltage during the half-wave cycles of the other polarity. Thus, when the difference between the lamp voltages (Vla1 and Vla2) measured during the half-wave cycles of the respective polarities is equal to or greater than a predetermined threshold Vref2, the judging unit judges that a half-wave discharge has occurred and keeps a count of occurrences of a half-wave discharge. When the count of occurrences of a half-wave discharge (half-wave discharge count) reaches a predetermined count C, it is judged that an outer-tube discharge has occurred. Thus, the control unit S1 outputs OFF signals to the switching elements.

Hereinafter, a description is given of operation according to Example 3.

Figure 16:
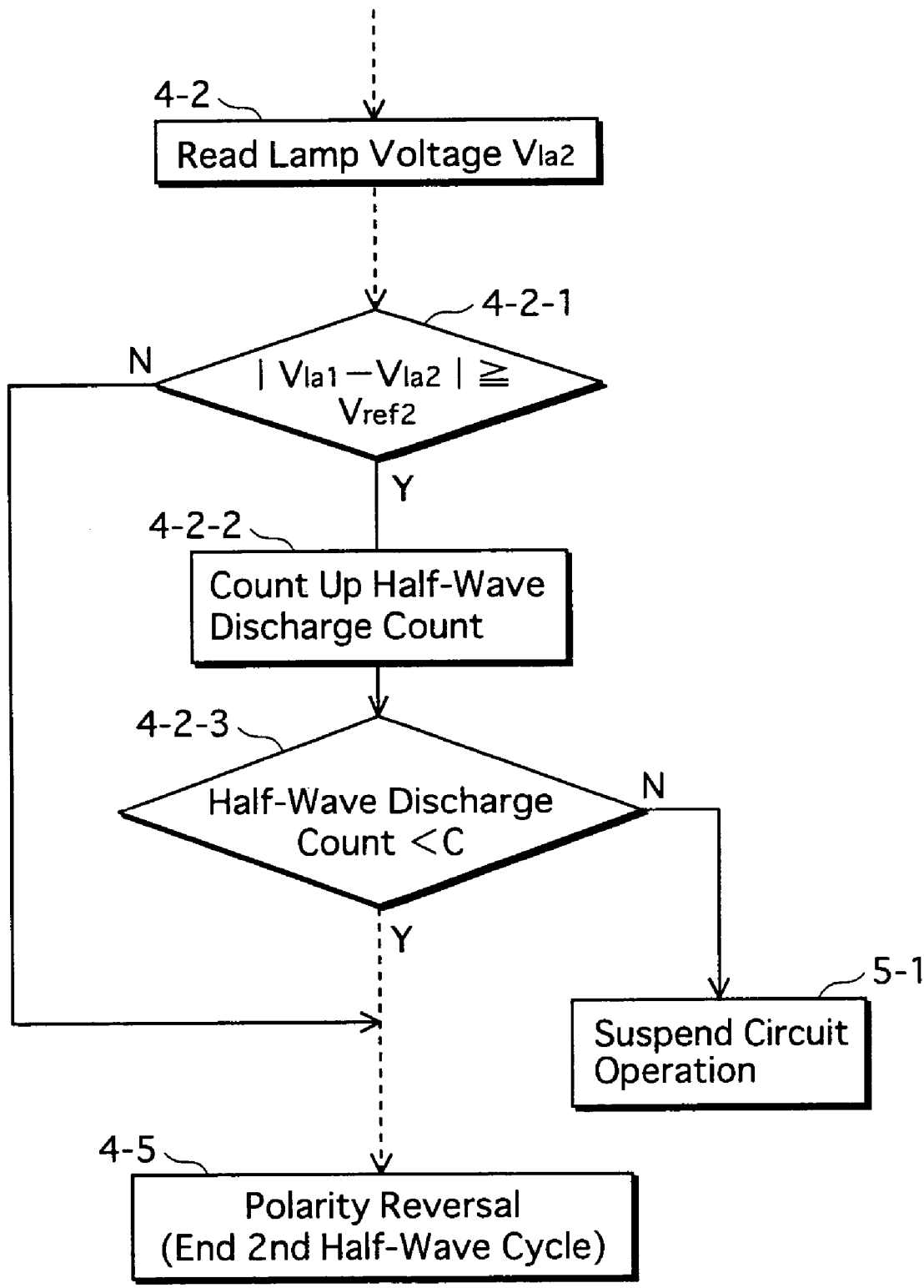
FIG. 16 is a flowchart of operating steps performed by the lamp lighting device according to Example 3.

FIG. 16 is a flowchart of operating steps performed by the lamp lighting device according to Example 3.

In addition to the operating steps shown in FIG. 8, the control unit S1 performs a step of counting the number of times that a half-wave discharge occurs during the first half-wave cycles. When the count (labeled as "half-wave discharge count" in the figure) reaches the predetermined count C, the control unit S1 performs a step of suspending the power supply. The additional steps are performed somewhere between Steps 4-2 and 4-5 shown in FIG. 8. Note that it is applicable to add the steps described above only to the operating steps regarding the second half-wave cycles. It is also applicable to add the above-described steps to both operations relating to the first and second half-wave cycles. This ensures further accuracy in detection of a half-wave discharge.

Specifically, as illustrated in FIG. 16, the lamp voltage Vla2 is read in Step 4-2. It is then judged in Step 4-2-1 that the difference (absolute value) between the lamp voltage Vla2 and the lamp voltage Vla1 is equal to or greater than the threshold Vref2, which is, for example, 20 V. If it is judged the difference is equal to or greater than the threshold Vref2 (Step S4-2-1: Y), Step 4-2-2 is performed next to count up the half-wave discharge count. More specifically, the half-wave discharge count is counted by the addition method.

Next, the half-wave discharge count is then compared in Step 4-2-3 with a judgment criterion of a predetermined count C (which, for example, is 500 times). If the half-wave discharge count exceeds the predetermined count C (Step 4-2-3: N), Step 5-1 is performed next to suspend the circuit operation.

In the above description, the threshold Vref2 is 20 V but without limitation thereto. Any other value may be determined as the threshold Vref2 as long as the threshold Vref2 is greater than the difference (absolute value) between the lamp voltage Vla2 and lamp voltage Vla1, which is the designed normal lamp voltage. Yet, some adjustments may be required in view of various lamp properties (such as lamp voltage variations and changes with operation time)

Note that during normal operation, the difference between the lamp voltages V1 and V2 shown in FIG. 11B according to this embodiment is about 2 V (theoretically, 0V). In addition, the difference between the lamp voltages Vla1 and Vla2 shown in FIG. 11A is about 400 V.

In addition, although the occurrences of a half-wave discharge is counted in Example 3, it is applicable to measure the total duration of a half-wave discharge and the circuit operation is suspended when, for example, the total duration is equal to or longer than a predetermined duration (3 sec, for example). The total duration may be calculated by multiplying the detection interval of the lamp voltage by the number of times it is judged that a half-wave discharge has occurred.

(4) EXAMPLE 4

In Example 4, the circuit operation is suspended in the case where the lamp lighting device continually output a low lamp voltage or a high lamp voltage. In other words, in the case where an outer-tube discharge stably continues as illustrated in FIG. 13. Note that the lamp voltage Vla1 shown in FIG. 13 is higher than the lamp voltage during under nominal operation and higher than a judgment criterion of Vhigh.

In Example 4, the detection is made as to whether the lamp voltage is higher or lower than the lamp voltage output during normal operation. More specifically, the control unit S1 counts the number of times that the lamp voltage Vla1 detected during the first half-wave cycles is blow a predetermined lower limit Vlow or higher than a predetermined upper limit Vhigh. If the count reaches a respective predetermined count D or E, it is judged that the currently occurring discharge is an outer-tube discharge.

Note that the relation Vlow<Vhigh is satisfied. Also in Example 4, it is the control unit S that makes the judgments as to the levels of lamp voltage as well as to the High-voltage count and the Low-voltage count.

Now, a description is given of operation according to Example 4.

Figure 17:
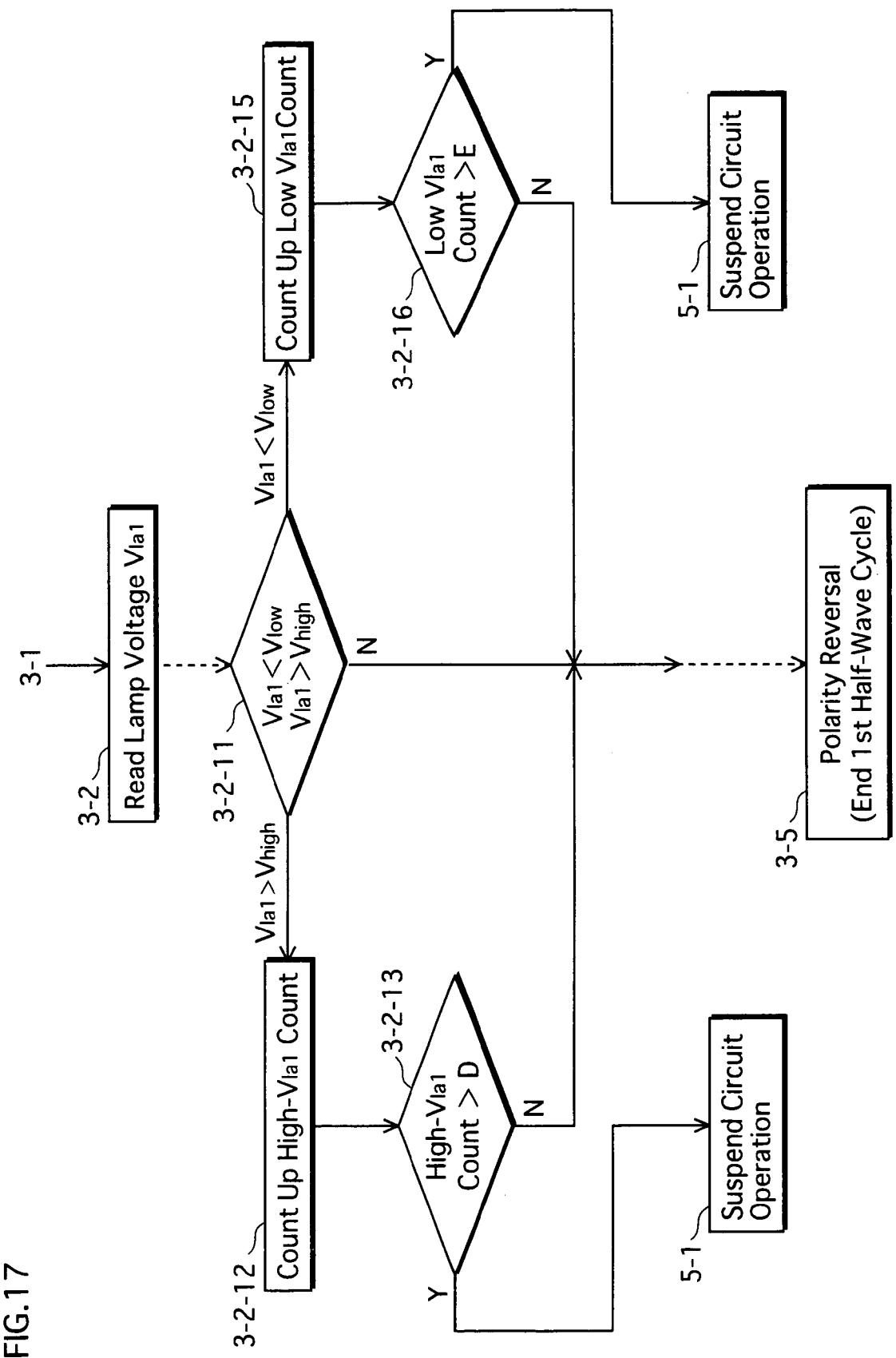
FIG. 17 is a flowchart of operating steps performed by the lamp lighting device according to Example 4.

FIG. 17 is a flowchart of operation performed by the lamp lighting device according to Example 4.

The control unit S1 judges in Step 3-2-11 that the lamp voltage Vla1 read in Step 3-2 is either below the lower limit Vlow or higher than the upper limit Vhigh.

If it is judged that the lamp voltage Vla1 is higher than the upper limit Vhigh (140V, for example), Step 3-2-12 is performed next to count up the number of occurrences that the upper limit Vhigh is exceeded (labeled as "High Vla Count" in the figure). It is then judged in Step 3-2-13 whether High Vla Count has reached the predetermined count D. If it is judged that the predetermined count D is reached (Step 3-2-13: Y), Step 5-1 is performed next to suspend the circuit operation.

On the other hand, if it is judged in Step 3-2-11 that the lamp voltage Vla1 is below the lower limit Vlow (55 V, for example), Step 3-2-15 is performed next to count up the number of occurrences that the lamp voltage is below the lower limit Vlow (denoted as "Low Vla count" in the figure). Then, it is judged in Step 3-2-16 whether Low Via count has reached the predetermined count E. If it is judged that the predetermined count E has been reached (Step 3-2-16: Y), Step 5-1 is performed next to suspend the circuit operation.

Similarly to the other Examples (1-3), the control unit S1 performs a step of counting occurrences that the lamp voltage measured during the first cycles is below the lower limit and also performs a step counting occurrences that the lamp voltage measured during the first cycles is higher the upper limit. If either of the counts exceeds a corresponding one of the predetermined counts D and E (200 times, for example), the control unit S1 performs a step of suspending the power supply. These additional steps may be performed somewhere between Steps 3-2 and 3-5 shown in FIG. 8.

It is applicable to add the operating steps described above only to the operation relating to the second half-wave cycles. It is also applicable to add the above steps to both the operations relating to the first and second half-wave cycles. With this arrangement, the detection of the lamp voltage below the lower limit or above the upper limit is carried out with further accuracy.

As described above, the control unit S1 in Example 4 counts the number of times that the lamp voltage is above the upper limit and the number of times that the lamp voltage is below the lower limit. Alternatively, however, it is applicable to measure the total duration of a half-wave discharge. The circuit operation is suspended when, for example, the total duration is equal to or longer than a predetermined duration (3 sec, for example). The total duration may be calculated by multiplying the detection interval of the lamp voltage by the number of times it is judged that a half-wave discharge has occurred.

(5) EXAMPLE 5

Examples 1-4 described above relate to how to judge occurrence of an outer-tube discharge, etc. It should be noted, however, that it is often the case where a normal discharge is unstable immediately after the lamp start-up. According to Example 3 and 4, there is a risk that such instability of a normal discharge may be judged in error as an outer-tube discharge.

In view of the above risk, Example 5 provides a mask function so that no detection of an outer-tube discharge etc. is performed for a predetermined period from the lamp start-up. Here, the predetermined time period from the lamp start-up is determined based on the count kept by the control unit S1.

Now, a description of operation performed by Example 5 is described.

Figure 18:
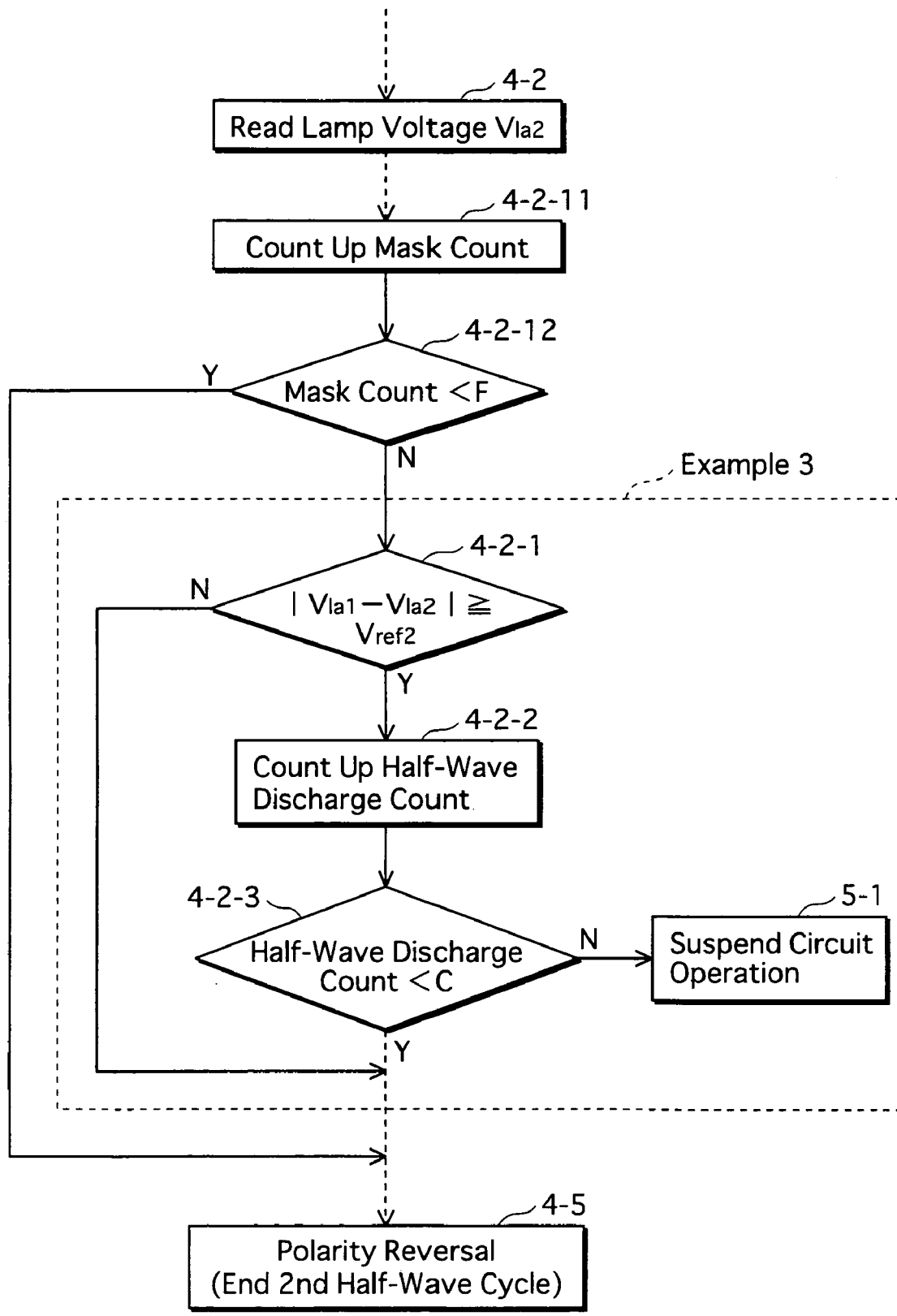
FIG. 18 is a flowchart of operating steps performed by the lamp lighting device according to Example 5.

FIG. 18 is a flowchart of operating steps performed by the lamp lighting device in Example 5.

Prior to Step 4-2-1 described in Example 3, the control unit S1 performs Step 4-2-11 of counting a number of times that the detection function is masked (hereinafter, referred to as a "mask count") and Step 4-2-12 of comparing the mask count with a judgment criterion of a predetermined count F.

If the mask count counted up in Step 4-2-12 has not yet reached the predetermined count F (Step 4-2-12: Y), it means that the lamp has just started and thus the discharge is not yet stable. Thus, the control unit S1 skips to a step subsequent to Step 4-2-3 (to Step 4-3, for example). Thus, no judgment is made as to occurrence of an outer-tube discharge. Note that the predetermined count F is appropriately determined in view of the time period during which the mask function is desired to be provided. Normally, the time period of masking is for about five minutes. Yet, adjustments may be made in view of various factors, such as the starting performance of the lamp, the time taken before the lamp operation stabilizes, and the operations performed by the lamp lighting device to start up the lamp.

(6) EXAMPLES 6 AND 7

Now, a description is given of the characteristics of a discharge targeted to be detected in Examples 6 and 7.

Figure 19:
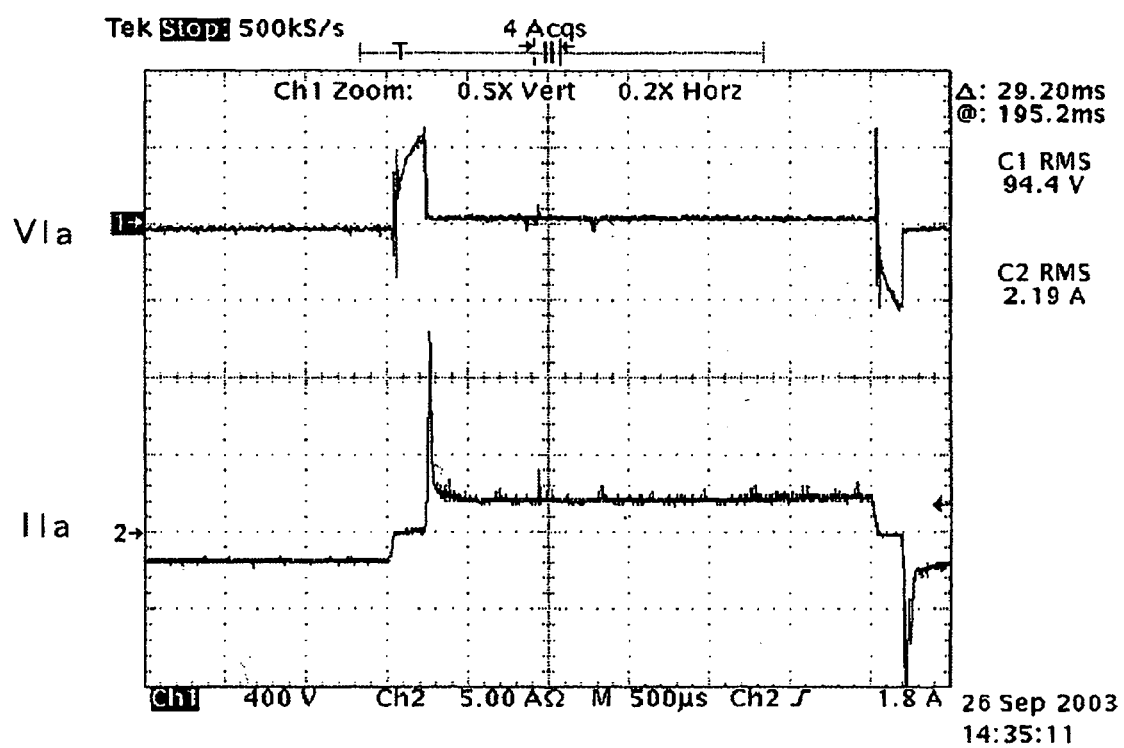
FIG. 19 is an enlarged view of part of the waveform immediately after polarity reversal shown in FIG. 10A.

FIG. 19 is an enlarged view of the waveform shown in FIG. 10A. More specifically, FIG. 19 shows part of the waveform immediately after polarity reversal. It should be naturally appreciated that FIGS. 10A and 19 are illustrated on different scales both in vertical and lateral axes.

The characteristics of a discharge targeted in Examples 6 and 7 are similar to those described regarding Example 1. That is, the discharge repeats fading-out and re-starting. In terms of the electrical property, as apparent from the waveform shown in FIG. 19, the lamp voltage Vla exhibits an instantaneous voltage (which corresponds to the re-ignition voltage shown in FIGS. 10). Here, the instantaneous voltage is an abrupt change for a predetermined duration of about 200 μsec (labeled as "T1" in FIG. 19) immediately after polarity reversal. Following the instantaneous voltage, an overshoot current of the lamp current Ila flows for a short period of time.

In view of that the instantaneous voltage is observed after polarity reversal, the lamp lighting device according to Examples 6 and 7 detect occurrence of an outer-tube discharge by detecting the instantaneous voltage following polarity reversal. The instantaneous voltage may be detected in two ways as described below in Examples 6 and 7.

(6-1) EXAMPLE 6

In Example 6, the lamp lighting device is provided with: a detecting unit for detecting the maximum lamp voltage value measured after polarity reversal; a judging unit for judging that the currently occurring discharge is an outer-tube discharge in the case where the detect maximum lamp voltage value is equal to or higher than a predetermined threshold; and an instructing unit for instructing the switching elements to be OFF if it is judged that an outer-tube discharge has occurred.

Figure 20:
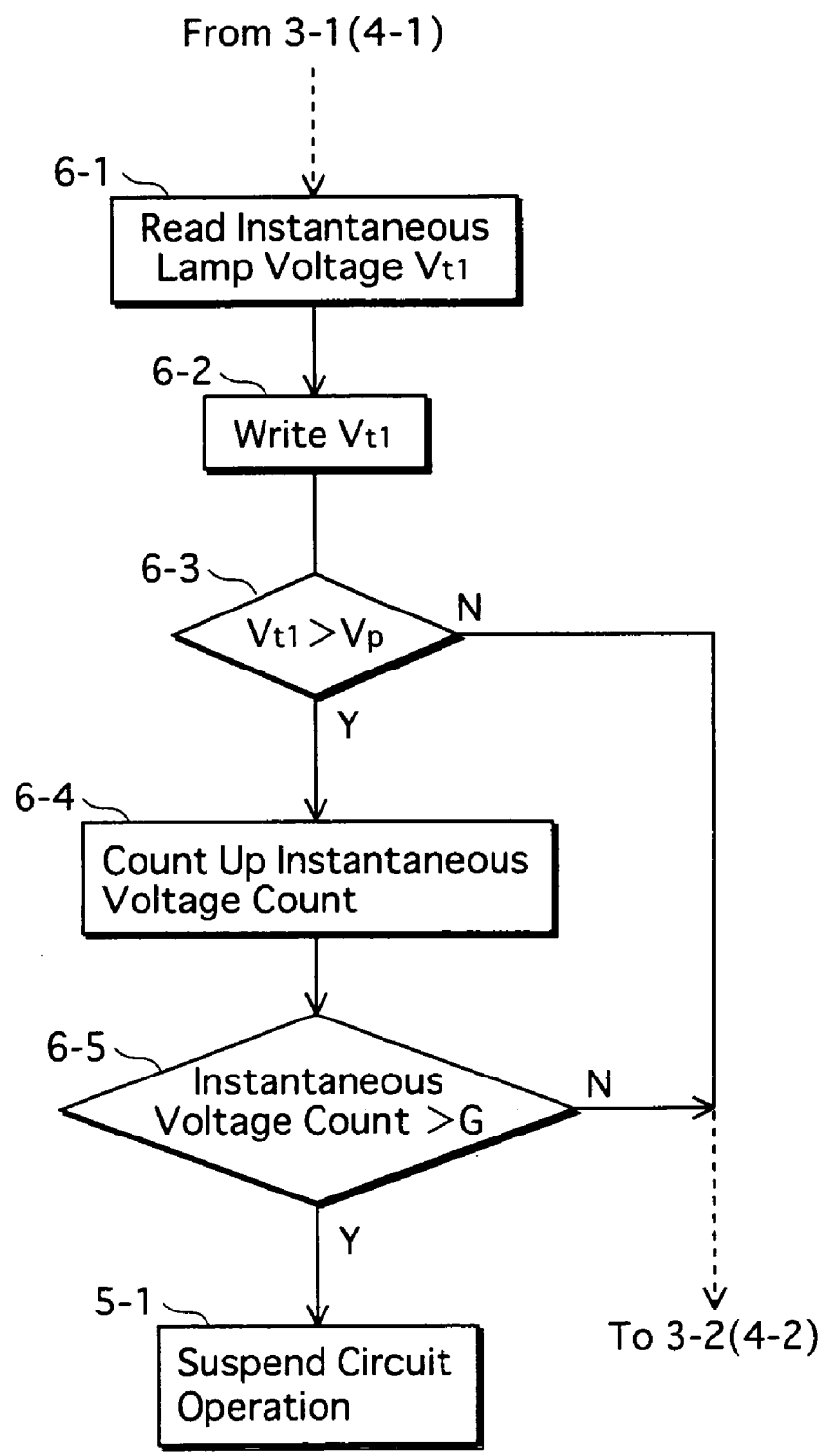
FIG. 20 is a flowchart of operating steps performed by the lamp lighting device according to Example 6.
Figure 21:
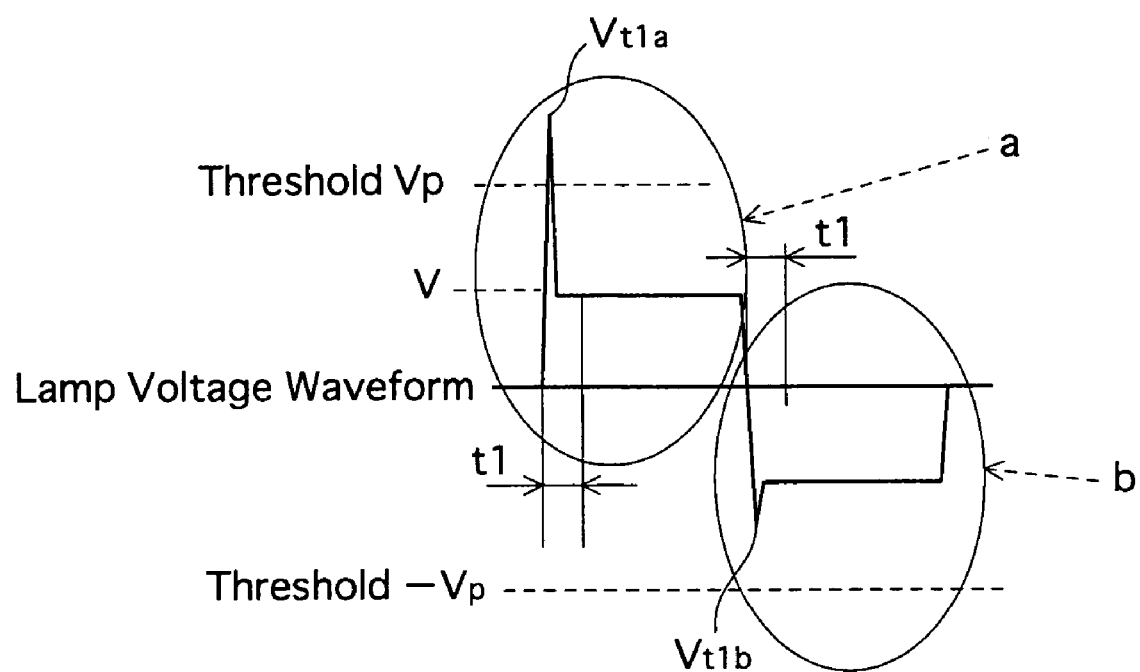
FIG. 21 schematically illustrates the waveforms observed during an outer-tube discharge according to Example 6.

A description of the operation performed by the lamp lighting device according to Example 6 is given below with reference to the FIGS. 20 and 21. FIG. 21 is a schematic view of the waveform observed during an outer-tube discharge. FIG. 20 is a flowchart of operating steps performed by the control unit to judge whether an outer-tube discharge has occurred.

The operating steps shown in the flowchart in FIG. 20 may be inserted, for example, at least either between Steps 3-1 and 3-2 or between Steps 4-1 and 4-2 shown in FIG. 8.

As illustrated in FIG. 20, the instantaneous voltage is read based on the lamp voltage detected during a time period t1 (Step 6-1). The period t1 is such a period that (i) starts immediately after polarity reversal (i.e., immediately after operation of the switching elements Q2 and Q3 or Q1 and Q4 starts), (ii) is sufficiently shorter than one half-wave cycle of a square wave; and (iii) includes the moment at which the instantaneous voltage occurs. In the case, for example, where the cycle of the square wave is 170 Hz, the length of the time period t1 is about 500 μsec. The voltage value read in Step 6-1 is stored as Vt1 (Step 6-2). Note that "Vt1" in FIG. 20 corresponds to "Vt1a" in FIG. 21.

The instantaneous lamp voltage is, for example, the maximum value among the lamp voltage values detected during the time period t1 that starts immediately after polarity reversal. Naturally, the lamp voltage values are periodically detected at intervals shorter than the time period t1.

Next, the instantaneous voltage Vt1 is compared in Step 6-3 with a predetermined threshold Vp. If the instantaneous voltage Vt1a exceeds the threshold Vp as illustrated in FIG. 21 in a circle a (Step 6-3: Y), Step 6-4 is performed next to count the number of times that the instantaneous voltage Vt1 exceeds the predetermined threshold Vp (labeled as "instantaneous voltage count" in the figure).

On the other hand, if the instantaneous voltage Vt1 is smaller than the predetermined threshold Vp (Step 6-3: N), Step 3-2 (or Step 4-2) shown in the flowchart in FIG. 8 is performed next. The instantaneous voltage Vt1 is smaller than the predetermined threshold Vp in the case, for example, of Vt1b illustrated in FIG. 21 in a circle b.

The above operation is repeated until it is judged in Step 6-5 that the instantaneous voltage count has reached a predetermined count G (ten times, for example) (Step 6-5: Y). Then, Step 5-1 is performed next to suspend the operation of the switching elements Q1-Q4, so that the power supply to the lamp is suspended.

On the other hand, if it is judged in Step 6-5 that the instantaneous voltage count has not yet reached the predetermined count G (ten times, for example) (Step 6-5: N), Step 3-2 (or Step 4-2) shown in the in flowchart in FIG. 8 is performed next.

That is, the control unit counts the number of times that the lamp voltage Vt1 (instantaneous lamp voltage) measured after polarity reversal exceeds the predetermined threshold Vp (which is at least 1.5 to 2 times the nominal lamp voltage V). When the instantaneous voltage count reaches the predetermined count G (ten time, in Example 6), it is judged that the lamp is under abnormal conditions (i.e., outer-tube discharge), so that operation of the lamp lighting device is suspended.

As described above, the threshold Vp is at least 1.5 to 2 times the nominal lamp voltage. Yet, in the case where fluctuations in the lamp voltage during normal operation is relatively small, the threshold may be set to be smaller than one and a half (1.5) times the nominal lamp voltage. On the other hand, in the case where the lamp voltage fluctuates relatively widely during normal operation, the threshold needs to be set to be larger than 2 times the nominal lamp voltage.

Through the above operating steps, it is reliably detected if the discharge of the lamp is in the outer-tube discharge state. Thus, operation of the lamp lighting device is suspended timely to suppress abnormal heat of the lamp lighting device, lamp socket, and wiring.

(6-2) EXAMPLE 7

According to Example 6 described above, the detected instantaneous (maximum) lamp voltage is compared with the predetermined multiple of the rated lamp voltage (that is, the comparison is made based on one voltage value). Yet, it is applicable that any values other than the lamp voltage value is compared. For example, it is applicable to make a comparison between (i) the average of lamp voltage values detected during the time period t1 after polarity reversal and (ii) the average of lamp voltage values detected during each half-wave cycle. It is also applicable that the comparison is made based on the effective values.

Figure 22:
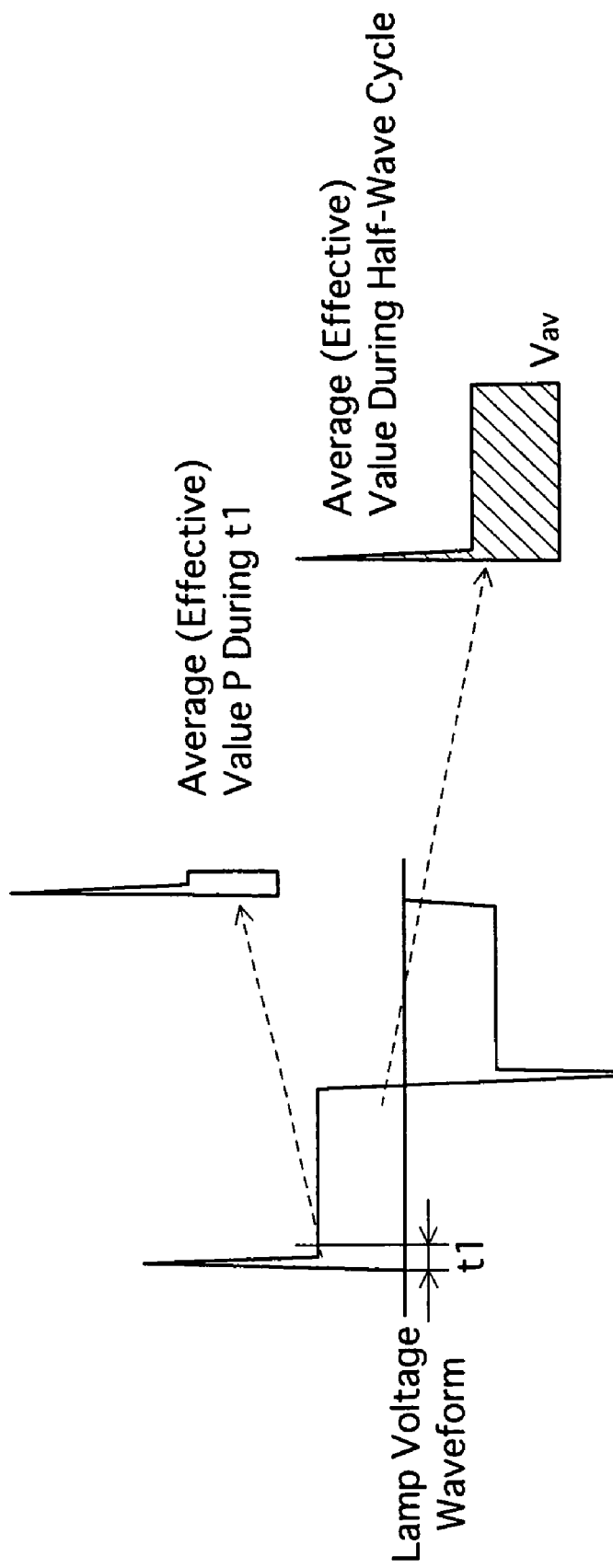
FIG. 22 schematically illustrates the waveforms observed during an outer-tube discharge.

Here, reference is made to FIG. 22 that schematically shows the waveform observed during an outer-tube discharge. In the figure, the reference numeral "P" denotes the average (or effective) value of the lamp voltage during the time period t1 that starts immediately after polarity reversal, and "Vav" denotes the average (or effective) value of the lamp voltage values measured during each half-wave cycle. A predetermined multiple of P (Vt2=P×K) is compared with the value Vav. If Vt2>Vav, it may be jugged that the currently occurring discharge is an outer-tube discharge.

Figure 23:
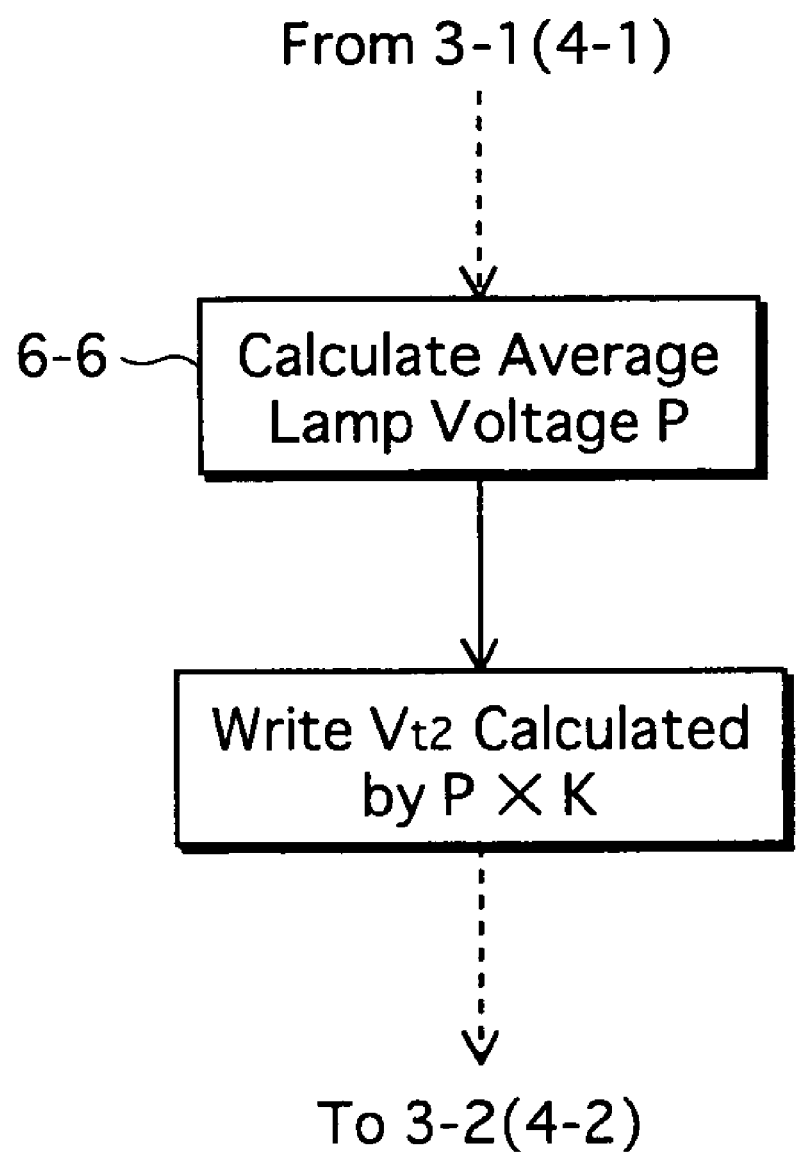
FIG. 23 is a flowchart of operating steps performed by the lamp lighting device according to Example 7.

FIG. 23 is a flowchart of operating steps performed by the control unit according to Example 7.

The operating steps shown in FIG. 23 are added to the main flowchart shown in FIG. 8 at least either between Steps 3-1 and 3-2 or between Steps 4-1 and 4-2. Furthermore, the operating steps shown in FIG. 24 are also added to the main flowchart at least either between Steps 3-2 and 3-3 or between Steps 4-2 and 4-3, more specifically at least either between Steps 3-1 and 3-2 or between Steps 4-1 and 4-2.

Hereinafter, a description is given of the operating steps added to the main flowchart. In Example 7, it is assumed that the waveform of an outer-tube discharge is as shown in FIG. 22.

First of all, the lamp voltage values are measured for a time period of 500 μsec in the case where the frequency of the square wave is 170 Hz, for example. The microcomputer A/D converts the measured lamp voltage values to calculate the average (effective) value P (Step 6-6). The resulting average value P is then multiplied by K (K=0.7, for example) and the multiplication result is stored as Vt2 (Step 6-7)

Figure 24:
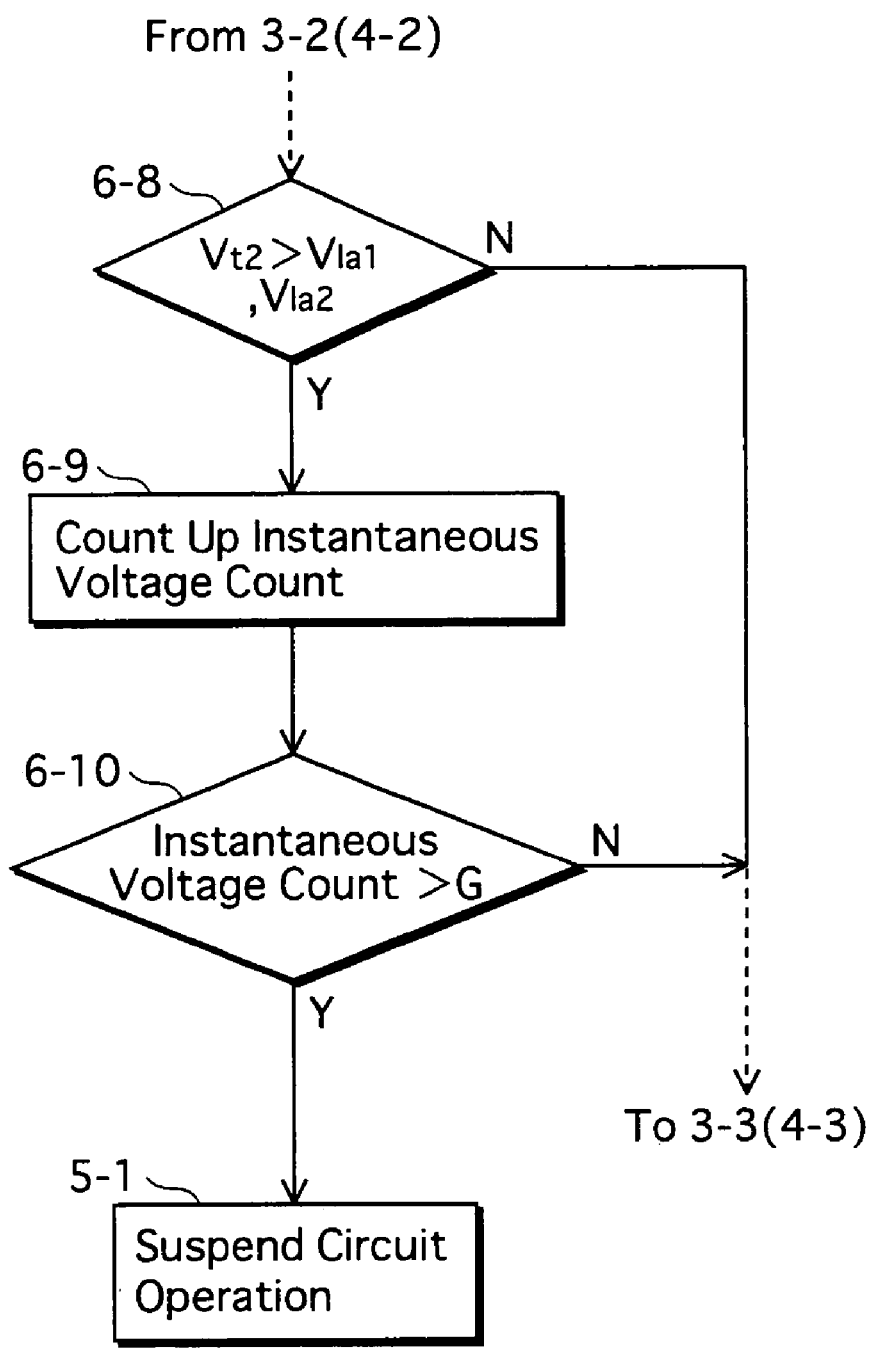
FIG. 24 is a flowchart of operating steps performed by the lamp lighting device according to Example 7.

Next, reference is made to FIG. 24. With the use of the lamp voltage Vla1 (Vla2) obtained in Step 3-2 (4-2) shown in FIG. 8, the lamp voltage Vla1 is compared with the value Vt2 (which is K-times the average lamp voltage P measured after polarity reversal) (Step 6-8).

If Vt2>Vla1 (Vla2) (Step 6-8: Y), Step 6-9 is performed next to count up the instantaneous voltage (i.e., increment by "1"). On the other hand, if Vt2<Vla1 (Vla2) (Step 6-8: N), Step 3-3 (or Step 4-3) shown in FIG. 8 is performed next.

The above operating steps are repeated until the instantaneous voltage count reaches the predetermined count G (ten times, for example) (Step 6-10: Y). If the predetermined count G is reached, Step 5-1 is performed next to suspend operation of the switching elements Q1-Q4. As a result, the power supply to the lamp is suspended. On the other hand, if it is judged in Step 6-10 that the instantaneous voltage count has not yet reached the predetermined count G (Step 6-10: N), Step 3-3 (or Step 4-3) shown in FIG. 8 is performed next.

Note the average of lamp voltage Vla is calculated, for example, by adding the measured lamp voltage values and by dividing the addition result by the number of times that the addition is performed. In addition, the value of K is set to be 0.7 in this example. Yet, as long as $0.5 \leq K < 1$ is satisfied, it is ensured to detect the instantaneous lamp voltage change occurred immediately after polarity reversal.

(6-3) Supplemental Note

In Examples 6 and 7, the additional operating steps of detecting an outer-tube discharge are performed between Step 3-1 (4-1) and Step 3-2 (4-2) or between Step 3-2 (4-2) and Step 3-3 (4-3) shown-in FIG. 8. It should be noted, however, that the additional steps may be performed at different timing than the timing described in Examples 6 and 7 as long as those steps are performed for each half-wave cycle.

(7) EXAMPLE 8

Example 5 provides the mask function to avoid erroneously judging that an outer-tube discharge is occurring when the discharge under normal lamp operation is unstable immediately after lamp start-up. It is naturally appreciated that the mask function is duly applicable to other Examples. Hereinafter, a description is given of Example 8 in which the mask function is applied to Example 6 and 7.

According to Example 8, a step of "counting up a mask count" and a step of judging whether a "mask count<F" is satisfied are performed in addition to the operating steps of the flowcharts shown in FIGS. 20 and 24. Hereinafter, a description is given with reference to FIGS. 25 and 26.

Figure 25:
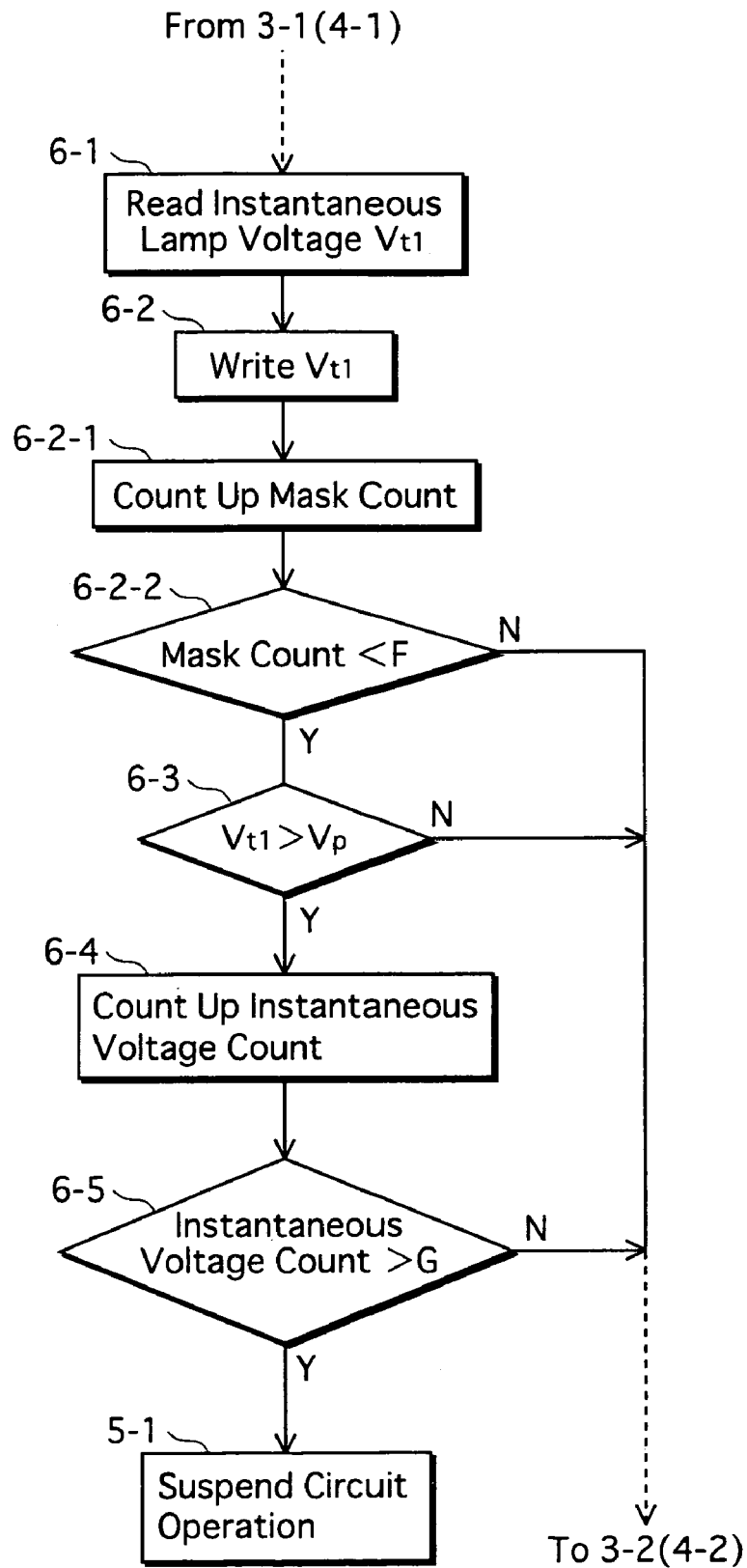
FIG. 25 is a flowchart of operating steps performed by the lamp lighting device according to Example 8.
Figure 26:
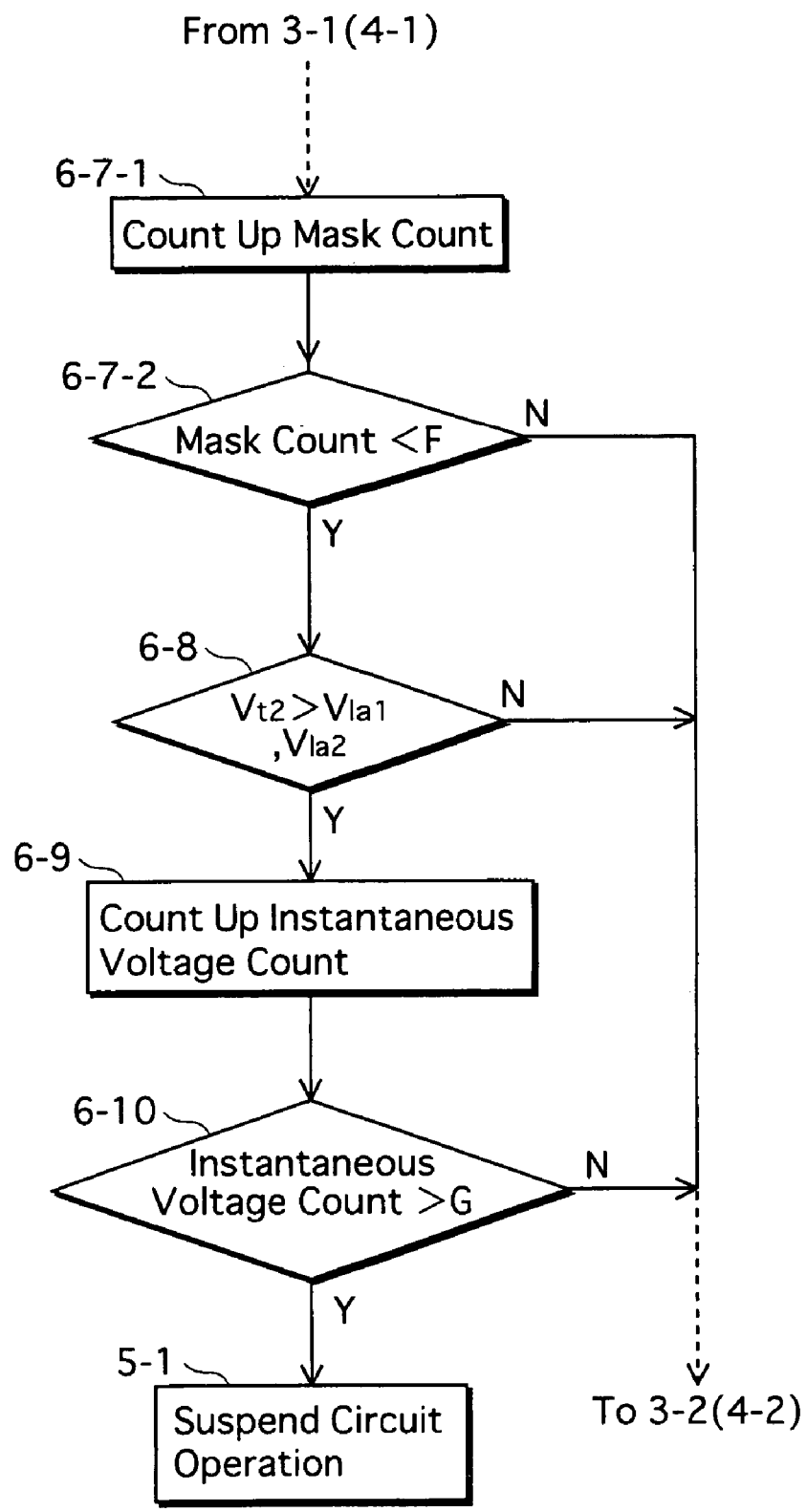
FIG. 26 is a flowchart of operating steps performed by the lamp lighting device according to Example 8.

FIG. 25 shows Step 6-2-1 of "counting up a mask count" and Step 6-2-2 of judging whether the "mask count <F" is satisfied. Similarly, FIG. 26 shows Step 6-7-1 of "counting up a mask count" and Step 6-7-2 of judging whether the "mask count<F" is satisfied. Steps 6-2-1 and 6-7-1 are identical to Step 4-2-11 shown in FIG. 18, whereas Steps 6-2-2.and 6-7-2 are identical to Step 4-2-12 also shown in FIG. 18. With these operating steps, it is judged whether a predetermined time period has passed after the lamp start-up (i.e., whether the mask count has reached a predetermined count F). Until the predetermined time period has passed, the instantaneous voltage count is never incremented.

With the mask function described above, it is ensured not to erroneously detect an outer-tube discharge when the lamp current waveform (or lamp voltage waveform) under normal lamp operation undergoes an abrupt change immediately after polarity reversal. Note that the time period for providing the mask function is determined, as described in Example 5, on the basis of the time taken for the lamp to stabilize after start-up (five minutes or so).

MODIFICATIONS

Up to this point, the present invention has been described by way of the above embodiment. Naturally, it is appreciated that the present invention is not limited to the specific embodiment described above. Various modifications including the following may be made.

1. Modifications to Lamp Lighting Device

The circuitry of the lamp lighting device according to the embodiment (Examples) described above may be either of a magnetic type or an electronic type, as long as the circuitry is capable of supplying electronic power. In the case of a light lighting device of an electronic type, in addition, it is applicable to employ the high-frequency lighting method, instead of the square-wave lighting method.

In Examples 1-5 described above, the effective values of the electrical properties are used for making a judgment regarding occurrences of an outer-tube discharge. Thus, in the case of a magnetic type lighting circuit, a detecting unit for detecting an effective value of an electrical property needs to be provided. (Examples of the detecting units include a converter, such as the one called a true effective value converter board, that converts an AC signal into a true effective value irrespective of the waveform and outputs the resulting values as a DC voltage.)

Furthermore, Examples 6 and 7 are applicable in the case where the lamp voltage is detected as an electrical property. This is because the magnetic type lighting circuit does not supply a square-wave lamp current.

Figure 27:
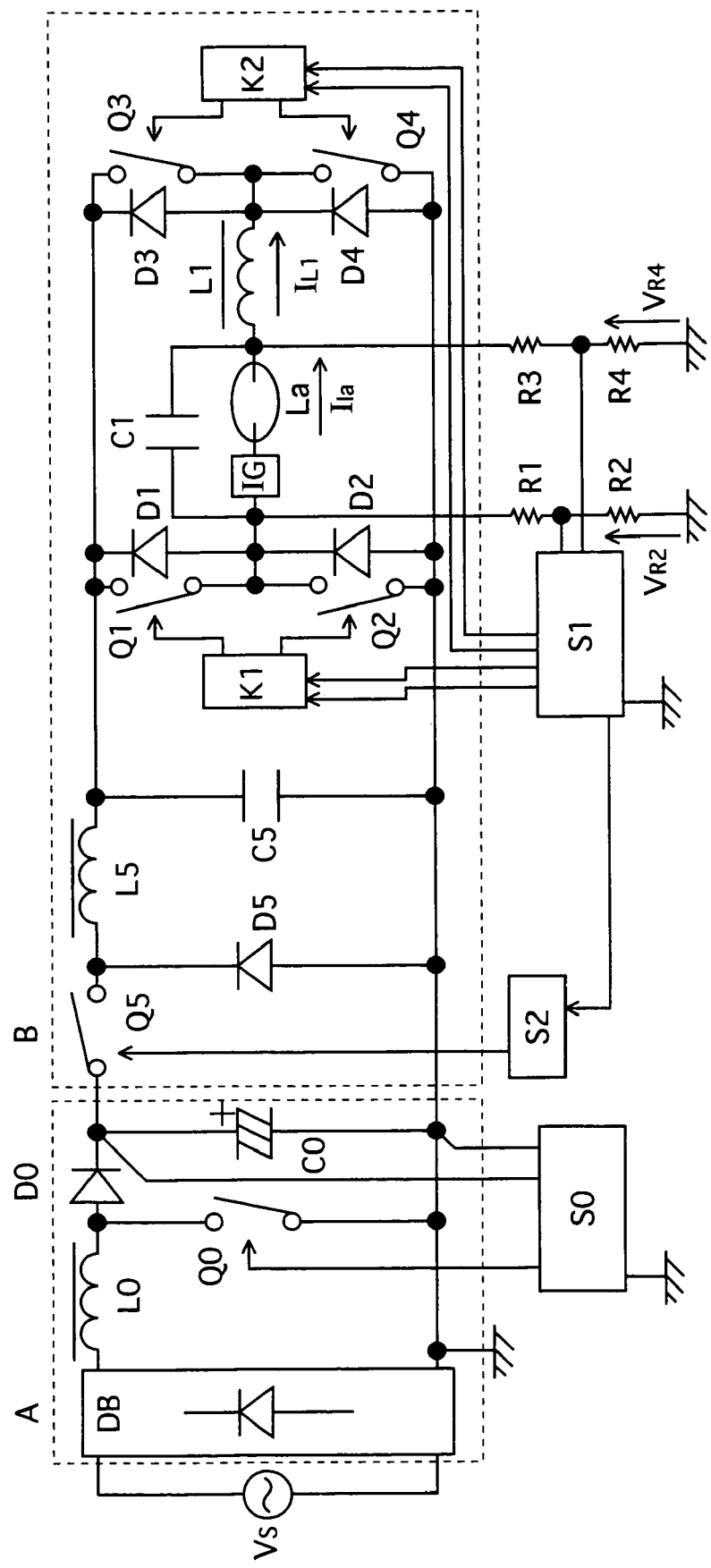
FIG. 27 is a circuit diagram of a lamp lighting device according to a modification of the present invention.
Figure 28:
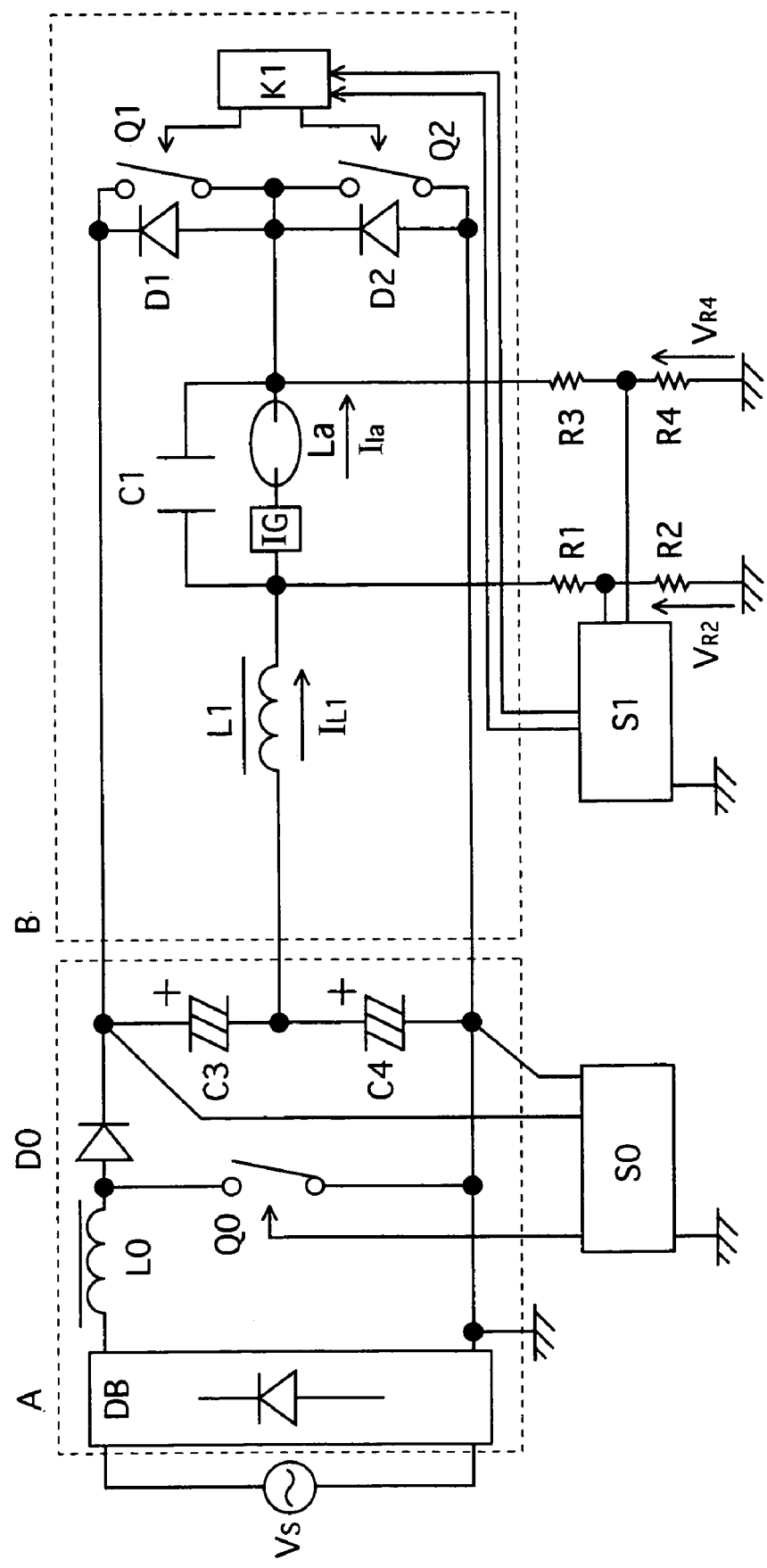
FIG. 28 is a circuit diagram, of a lamp lighting device according to another modification of the present invention.

Furthermore, the lighting circuit employed in the above embodiment is so-called a full-bridge inverter circuit, as shown in FIG. 3. Alternatively, however, the lighting circuit may be so-called a five-switching circuit, which is a combination of a step-down chopper circuit and a low-frequency polarity reversal circuit illustrated in FIG. 27. Alternatively, the lighting circuit may be so-called a half-bridge lighting circuit, which is a combination of two switching elements and two capacitors illustrated in FIG. 28 (the capacitor C4 stores electric charges during the time the switching element Q1 is ON, and the capacitor C3 stores electric charges during the time the switching element Q2 is ON) Note that the reference numerals "S0" and "S2" in FIGS. 27 and 28 each denote the control unit of the chopper circuit and "IG" denotes the igniter.

2. Modifications to Lamp (1) Regarding Rated Power

According to the embodiment described above, the rated power of the metal halide lamp is 150 W as one example. Yet, the same effect described above is achieved with a metal halide lamp of which rated lamp power is, for example, 20 W-400 W.

Furthermore, the lamp according to the above embodiment has an envelope made of a ceramic material. Alternatively, however, a conventional lamp having an envelope made of, for example, quartz glass may be employed.

Generally, a lamp with a relatively high rated lamp power is with low power losses, so that the luminous efficiency tends to increase. On the other hand, a lamp with a relatively low rated lamp power of, for example, 150 W, power losses are relatively large, so that the luminous efficiency tends to decrease. Due to the difference in rated lamp power, the advantageous effect achieved by each lamp may differ to some extent. Yet, it is still ensured that a lamp according to the present invention is higher in luminous efficiency as compared with a conventional lamp of comparable rated lamp power.

(2) Regarding Filling

According to the above-described embodiment, the lanthanum halide filled in the arc tube is either praseodymium iodide or cerium iodide alone. It should be naturally appreciated, however, that the arc tube may be filled with both praseodymium iodide and cerium iodide, or with, in addition to either praseodymium iodide or cerium iodide, any other lanthanum halide, such as lanthanum (La) or neodymium (Nd). The lamp according to the present invention with such filing still achieves the same advantageous effect described above.

Furthermore, according to the embodiment described above the arc tube is filled with either praseodymium iodide or cerium iodide, in addition to lanthanum halide, sodium iodide, and either of mercuric iodide or mercurous iodide. It is naturally appreciated, however, that any metal halides known in the art maybe added appropriately in view of desired color temperature and color rendering property.

Still further, according to the embodiment described above, the metal halide filled in the arc tube is metal iodide as one example. It should be noted, however, that the arc tube may be filled with any other metal halide, such as metal bromide. Such a lamp still achieves the same advantages effect as described above.

(3) Regarding Arc Tube Shape

According to the embodiment described above, the arc tube 6 has a shape as shown in FIGS. 1 and 2. Yet, it is also applicable to use an arc tube having a different shape. For example, arc tubes 6a, 6b, 6c, 6d, 6e, and 6f shown in FIGS. 29A-F may be used. It should be noted, however, that each of the arc tubes 6a, 6b, 6c, 6d, 6e, and 6f shown in FIGS. 29A-F is an ellipsoidal body having a longitudinal axis (denoted with "C" in the figures) as its axis of revolution. The figures are illustrated in a manner not showing the wall thickness of the arc tubes. Each of the arc tubes 6a, 6b, 6c, 6d, 6e, and 6f has the outer shape and the inner shape as illustrated in the respective figures. In addition, it is applicable to additionally provide a thin tube portion to any of the arc tubes 6a, 6b, 6c, 6d, 6e, and 6f.

Figure 29A:
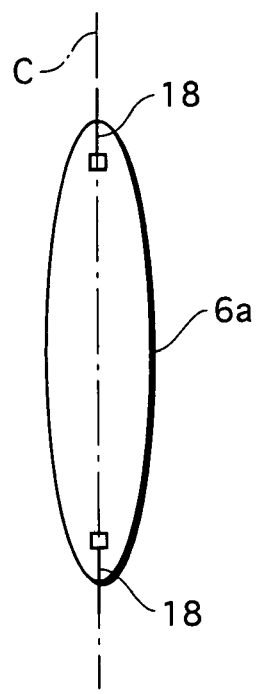
FIG. 29 are views illustrating arc tubes according to modifications of the present invention.

Specifically, the arc tube 6a shown in FIG. 29A is elliptical in sectional outline taken along a surface containing the longitudinal axis. With this simple structure, the arc tube 6a is suitable for mass production at low cost and without much color temperature variations among the finished produces. For this advantage, lamps or illumination devices employing an arc tube 6a are suitable for use within relatively confined spaces. This achieves an advantageous effect that the color temperature variations are less noticeable.

Figure 29B:
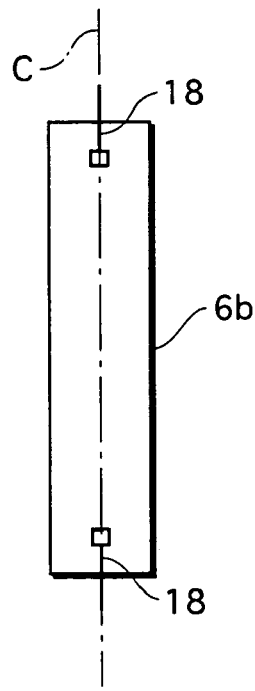

The arc tube 6b illustrated in FIG. 29B is rectangular in sectional outline taken along a surface containing the longitudinal axis. With this shape, the arc tube 6b is especially advantageous to suppress change in color temperature during a useful life of the lamp.

Figure 29C:
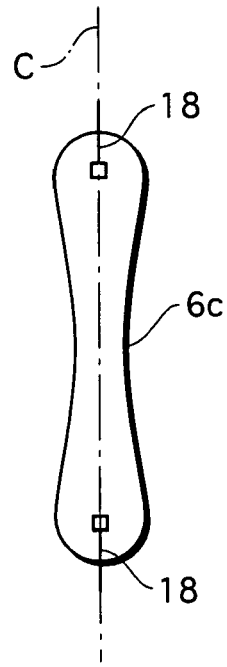

The arc tube 6c illustrated in FIG. 29C has two half-round ends in sectional outline taken along a surface containing the longitudinal axis. In addition, the middle portion connecting the two half-round ends is constricted. Thus, each longitudinal sideline generally defines an inwardly curved line. The arc tube 6c is advantageous in that illumination starts more promptly after the lamp start-up. For example, the time taken by the lamp to reach a rated light output is shortened by 10% to 20%, although its extent may differ depending of the designs. Further, arc distortion of the lamp at the time of horizontal state lighting is avoided, and occurrences of flicker are reduced.

Figure 29D:
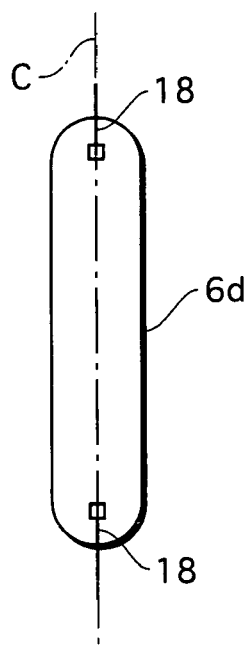

The arc tube 6d illustrated in FIG. 29D has two half-round ends in sectional outline taken along a surface containing the longitudinal axis. In addition, the two half-round ends are connected to each other with straight lines. Among the arc tubes shown in FIG. 29, the arc tube 6d is capable of most effectively suppressing change in color temperature during lifetime of the lamp.

Figure 29E:
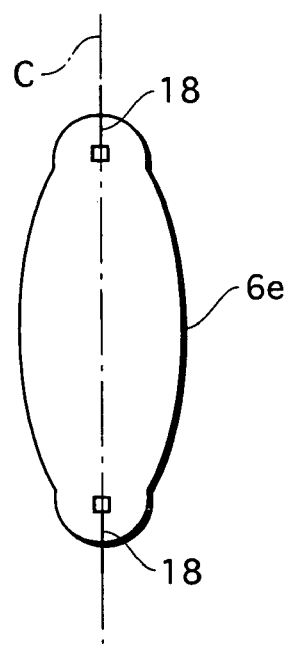

The arc tube 6e shown in FIG. 29E has two half-round ends in sectional outline taken along a surface containing the longitudinal axis. In addition, the two half-round ends are connected to each other with outwardly curved lines. Similarly to the arc tube 6a, the arc tube 6e is suitable for mass production without much color temperature variations among the finished produces. For this advantage, lamps or illumination devices employing an arc tube 6e are suitable for use within relatively confined spaces. This achieves an advantageous effect that color temperature variations are less noticeable.

Figure 29F:
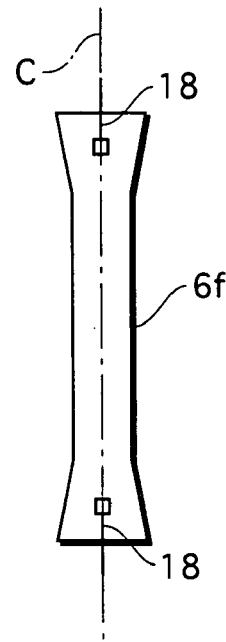

The arc tube 6f shown in FIG. 29F has two substantially trapezoidal ends taken along a surface containing the longitudinal axis. In addition, the substantially trapezoidal ends are connected to each other with straight lines. Similarly to the arc tube 6c, the arc tube 6f is advantageous in that illumination starts more promptly after the lamp start-up. For example, the time taken by the lamp to reach a rated light output is shortened by 10% to 20%, although its extent may differ depending of the designs. Further, arc distortion of the lamp at the time of horizontal state lighting is avoided, and occurrences of flicker are reduced.

It is noted that each of the arc tubes 6a, 6c, and 6e shown in FIG. 29A, 29C, and 29E has an inner diameter D that varies along the longitudinal axis. In this case, the inner diameter measured at a mid point between the electrodes 18 is determined as the inner diameter D of the respective arc tube.

3. Modifications to Detecting Unit

In Examples 1-8, changes in the electrical property of the lamp are detected by reading the lamp voltage. Yet, it is naturally appreciated that the detection may be carried out using other electrical properties, such as a lamp current. Note, in addition, that the lamp current may be detected from a voltage across serially connected resistors (not variable). Alternatively, the lamp current may be detected by replacing the inductor L1 shown in FIG. 3 with a current transformer CT, so that the secondary current is detected.

(1) Regarding Example 1

According to Example 1 described above, the lamp voltage Vla is detected. Upon occurrence of fading-out, the lamp current Ila drops to substantially "0". Thus, the detecting unit may detect the lamp current Ila. If the lamp current Ila is substantially equal to "0" for at least a predetermined duration, it may be judged that an outer-tube discharge etc. is occurring.

(2) Regarding Example 2

According to Example 2 described above, the, lamp voltage Vla is detected because it varies relatively widely. Yet, the lamp current Ila varies in proportion to the lamp voltage. Thus, it is applicable that the detecting unit detects the lamp current Ila. If the lamp current Ila repeatedly rises above and drops blow a threshold, a judgment as to occurrences of an outer-tube discharge may be made based on the number of times that the lamp current Ila varies above or blow the threshold.

(3) Regarding Example 3

According to Example 3 described above, the lamp voltages Vla1 and Vla2 are detected during half-wave cycles of the respective polarities. If the difference between Vla1 and Vla2 is equal to or greater than the predetermined value, it is judged that a half-wave discharge is occurring. Yet, it is-applicable that the detecting unit detests the lamp currents during half-wave cycles of the respective polarities. If a difference between the respective lamp currents is equal to or greater than a predetermined value, it may be judged that a half-wave discharge is occurring.

(4) Regarding Example 4

According to Example 4 described above, the lamp voltage is detected during each half-wave cycle of one of the polarities. If the detected lamp voltage is blow a lower limit or above an upper limit, it is judged that an outer-tube discharge is occurring. Yet, it is also applicable that the detecting unit detects the lamp current during each half-wave cycle of one of the polarities and compares the detected lamp current with a predetermined lower limit and/or upper limit to judge whether an outer-tube discharge is occurring.

(5) Regarding Examples 6 and 7

According to Examples 6 and 7 described above, the lamp voltage is detected. It is judged that outer-tube discharge is occurring if the lamp voltage changes abruptly. Yet, it is also applicable that the detecting unit detects the lamp current. If the lamp current changes abruptly, it is judged that an outer-tube discharge is occurring.

(6) In Closing

It is also applicable that the detecting unit detects both the lamp voltage and lamp current as the electrical properties of the lamp. According to the embodiment describe above, the lamp voltage is detected. In the case where a lamp current needs to be detected, the lamp current may be detected from a voltage across serially connected resistors (not variable). Alternatively, the lamp current may be detected by replacing the inductor L1 shown in FIG. 4 with a current transformer CT, so that the secondary current is detected.

5. Modifications to Mask Function

According to the embodiment above the mask function is provided to the lamp according to Example 3 (this arrangement corresponds to Example 5). In addition, the mask function is provided to the lamp according to Examples 6 and 7 (this arrangement corresponds to Example 8). It should be naturally appreciated, however, that the mask function may be provided to other Examples.

6. Additional Note (1) Modifications to Example 1

According to Example 1, a judgment as to the no-load conditions is made by detecting the lamp voltage Vla and comparing the lamp voltage Vla with the threshold voltage Vmax, which takes on a constant value. It should be naturally appreciated, however that the voltage threshold used for a judgment of the no-load conditions maybe variable.

Figure 30:
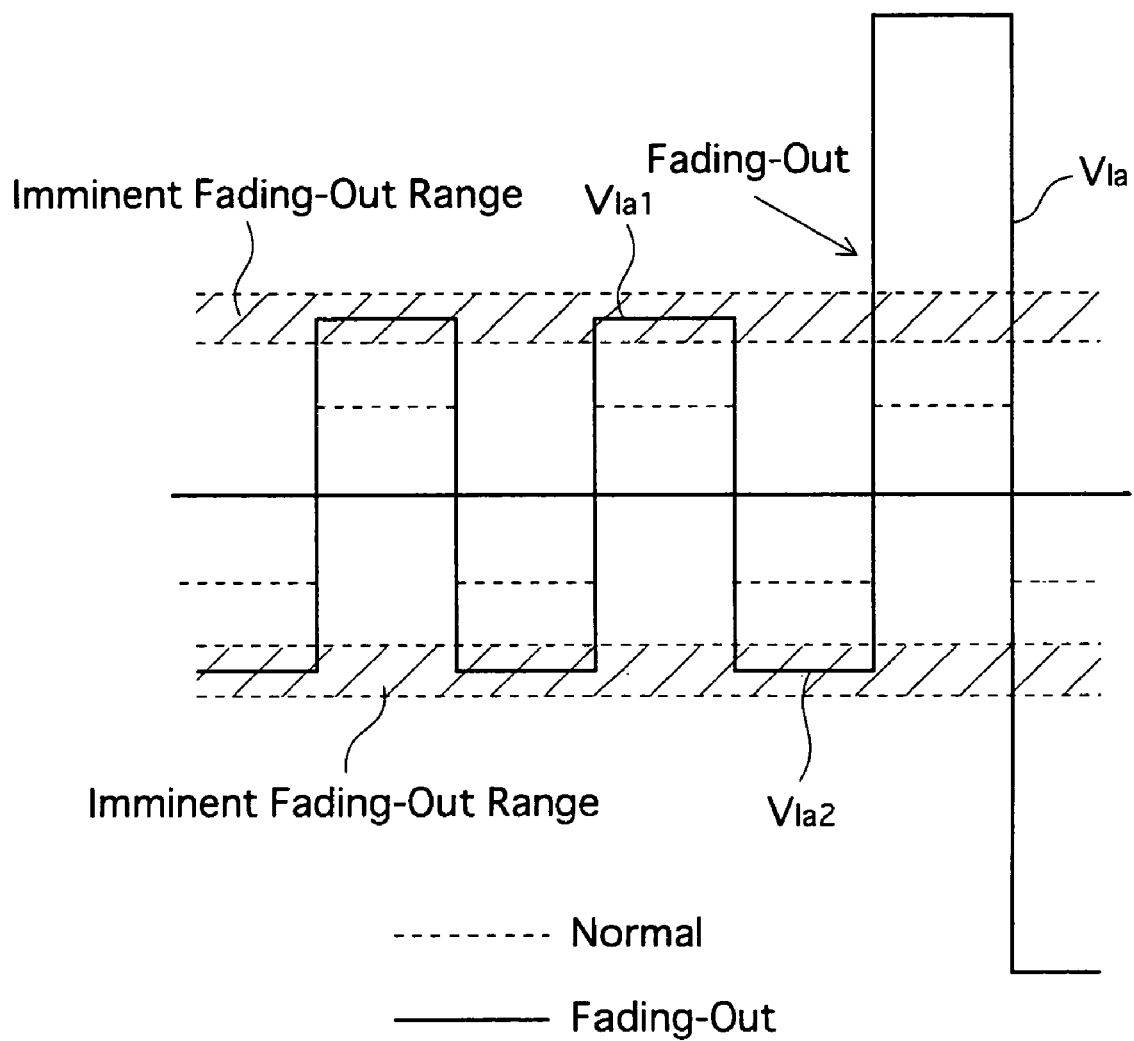
FIG. 30 is a waveform diagram of lamp characteristics according to Modification 1.

That is to say, the fading-out that occurs at the end of useful life of the lamp tends to be higher than the lamp voltage during normal operation. Thus, the judgment regarding the no-load conditions may be made by, as shown in FIG. 30 for example, judging whether the detected lamp voltage falls within a range in which fading-out is imminent.

(2) Modifications to Example 2 (Part 1)

According to Example 2, the judging unit judges that an outer-tube discharge is occurring, when the count of occurrences that the lamp voltage Vla fluctuates beyond the threshold Vref reaches the predetermined count. In other words, the threshold Vref, which is used as a judgment criterion, is one fixed value. Yet, it is also applicable that the judgment is made based on a predetermined voltage range having a certain width. Hereinafter, a description is given of Modification 2 in which a judgment as to whether an outer-tube discharge is occurring is made using, as a judgment criterion, a predetermined voltage range having a predetermined width.

Figure 31:
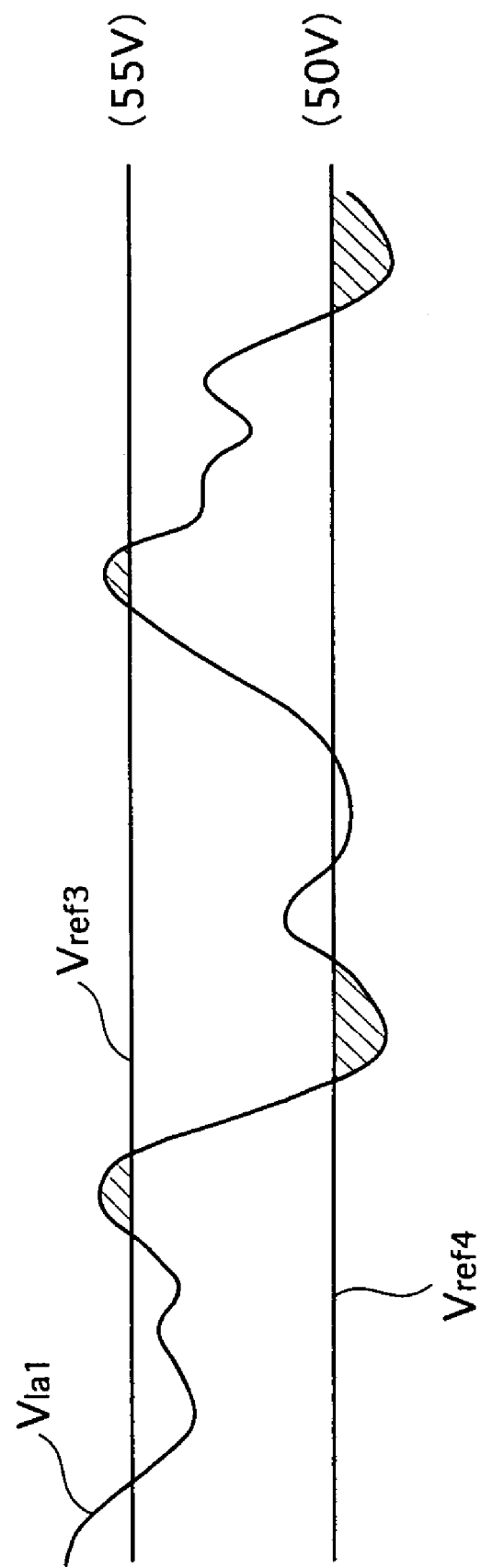
FIG. 31 is a waveform diagram of lamp voltage according to Modification 2.
Figure 32:
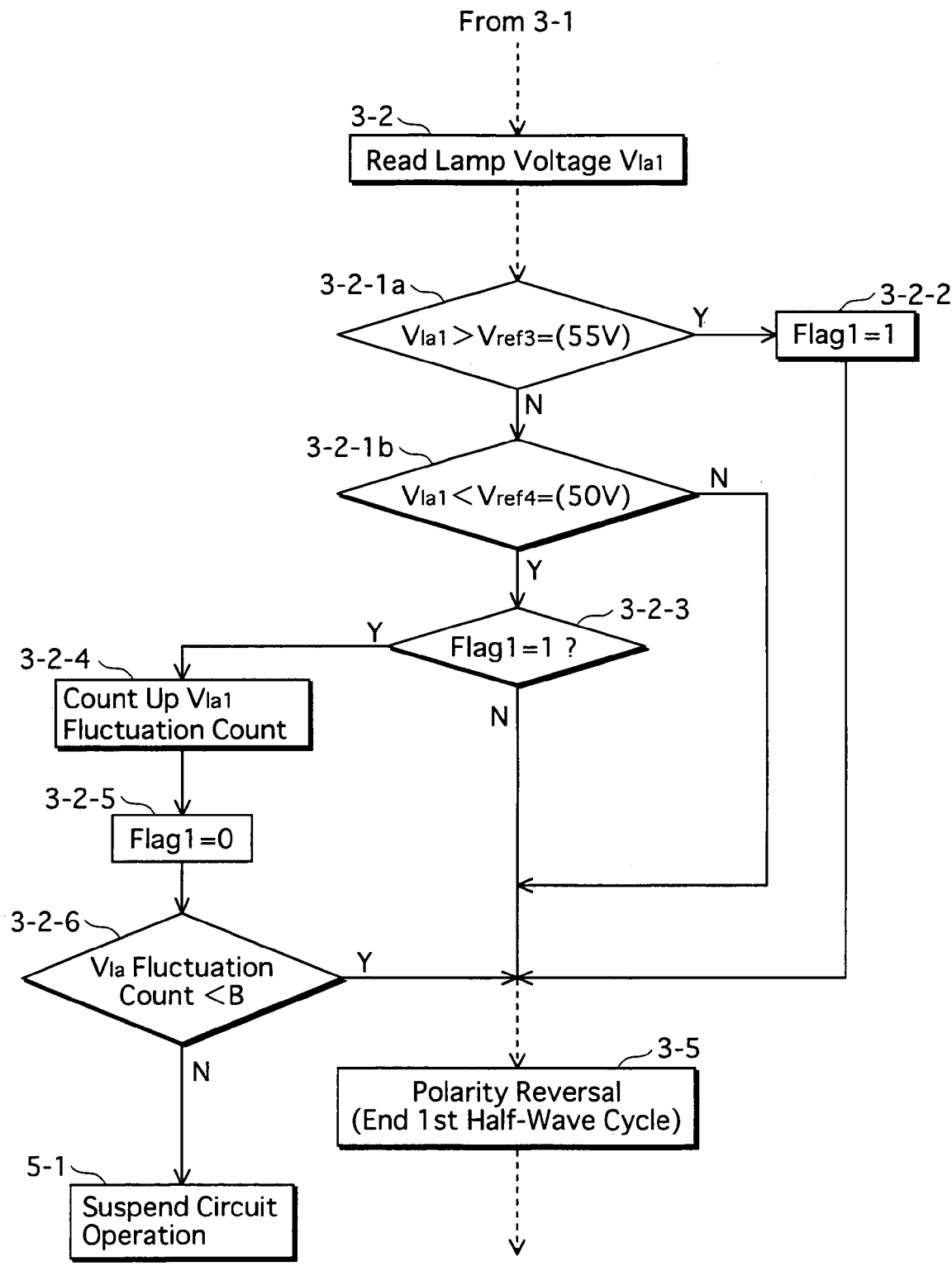
FIG. 32 is a flowchart of operating steps performed by the lamp lighting device according to Modification 2.

FIG. 31 illustrates the lamp voltage waveform to be detected according to Modification 2. FIG. 32 is a flowchart of the lamp lighting device according to Modification 2.

First of all, the lamp voltage Vla1 according to Modification 2 fluctuates up and down as illustrated in FIG. 31. The judgment criterion used in Modification 2 is, for example, a reference range from 50 V to 55 V having a width of 5V (which corresponds to the predetermined width). It is judged that an outer-tube discharge is occurring, when a number of times the lamp voltage Vla1 rises beyond and drops below the predetermined reference range reaches a predetermined count.

More specifically, as illustrated in FIG. 32, the lamp voltage Vla1 is read in Step 3-2, and the read lamp voltage is compared to see if the upper limit is exceeded, in Step 3-2-1*a* with the upper limit Vref3 (55V) of the predetermined reference range.

If it is judged in Step 3-2-1*a* that the lamp voltage Vla1 exceeds the upper limit Vref3 (Step 3-2-1*a*: Y), Step 3-2-2 is performed next, just as in Example 2. On the other hand, if it is judged that the lamp voltage Vla1 is equal to or less than the upper limit Vref3 (Step 3-2-2: N), Step 3-2-1*b* is performed next.

In Step 3-2-1*b*, the lamp voltage Vla1 is compared with the lower limit Vref4 of the predetermined reference range to see if the lamp voltage Vla1 is below the lower limit Vref4. If it is judged that the lamp voltage Vla1 is below the lower limit Vref4 (Step 3-2-1*b*: Y), Step 3-2-3 is performed next, just as in Example 2. In Step 3-2-3, it is judged whether Flag1 is set to "1".

Note that the other steps are identical to those described in Example 2 and thus such description is not repeated here. In addition, although the additional steps described above are carried out using the lamp voltage, it is also applicable to use the lamp current (See the above description with the heading "(2) Regarding Example 2" under the "3. Modifications to Detecting Unit" section).

As described above, by using, as the judgment criterion, a reference voltage range having a certain width, the risk is reduced of erroneously judging a normal discharge as an outer-tube discharge.

More specifically, the electrical property (the lamp voltage, in this description) may momentary fluctuates due to noise generated for some reason. With the fixed threshold value, there is a risk that such fluctuations resulting from noise is detected. Such detection may lead to an erroneous judgment that a normal discharge as an outer-tube discharge. In contrast, if the judgment criterion is a reference voltage range having a certain width (5 V, for example) to accommodate fluctuations in the electrical property expected during normal discharge, the risk of such an erroneous judgment is reduced.

Still further, according to Example described above, a judgment as to whether an outer-tube discharge is occurring is made based on a count of fluctuations beyond the judgment criterion. Alternatively, however, it is applicable to make the judgment based on, for example, a difference between two lamp voltage values detected at different timing. If the difference is equal to or greater than the predetermined value (5 V, for example), it is judged that an outer-tube discharge is occurring.

(3) Regarding Example 2 (Part 2)

According to Example 2 described above, both the lamp voltages Vla1 and Vla2 are detected in half-wave cycles of the respective polarities. Yet, it is also applicable to only detect the lamp voltage Vla1 in positive phase half-wave cycles. The judgment as to whether an outer-tube discharge is occurring is made based on fluctuations in the lamp voltage Vla1. Reversely, it is applicable to only detect the lamp voltage Vla2 during negative phase half-wave cycles. The judgment as to whether an outer-tube discharge is occurring is judged based on the lamp voltage Vla2.

Still further, according to Example 2 described above, the lamp voltage is detected once every half-wave cycle. Yet, the number of detection to be made in each half-wave cycle is not limited to "1". It is applicable to detect the lamp voltage a plurality of number of times ("3" times, for example). Naturally, it is also applicable to detect the lamp voltage a plurality of number of times in each half-wave cycle of one of the polarities, as in the modification described immediately above. In addition, although the description herein relates to the lamp voltage, this description holds regarding the lamp current.

(4) Regarding Example 4

According to Example 4, the judgment unit counts up each time the value detected by the detection unit exceeds the predetermined upper limit or each time the value detected by the detection unit is below the predetermined lower limit. Then, it is judged that an outer-tube discharge is occurring, if the count reaches the predetermined count. Alternatively, however, it is also applicable to measure a duration in which the detected value is beyond the predetermined upper limit or a duration in which the detected value is below the predetermined lower limit. It is then judged that an outer-tube discharge is occurring, if the measured duration is equal to or linger than a predetermined duration. In this case, the duration is measured by, for example, counting the number of detection intervals at which the value beyond or below a respective limit is consecutively detected.

(5) Additional Note

It is naturally appreciated that any combination of Examples of the above-described embodiment may be made without departing from the gist of the present invention.

Further, according to the above-embodiment, the power supply to the lamp is suspended upon a judgment that the discharge is in the outer-tube discharge state or in the state preceding the outer-tube discharge state. Yet, it is also applicable to reduce the power supply to the lamp upon such a judgment.

INDUSTRIAL APPLICABILITY

The present invention is applicable to a lighting system and a lamp lighting device that improves safety by restricting lamp operation upon occurrence of an outer-tube discharge.

The invention claimed is:

1. A lighting system including:
    a metal halide lamp having an arc tube housed within an outer tube; and
    a lamp lighting device for operating the metal halide lamp,
    the lamp lighting device comprising:
    a power supply unit operable to supply an electric power to the metal halide lamp;
    a detecting unit operable to detect an electrical property of the metal halide lamp;
    a judging unit operable to judge, based on the detected electrical property, whether a currently occurring discharge is in either of (i) an outer-tube discharge state in which a discharge occurs inside the outer tube but outside the arc tube and (ii) a state preceding the outer-tube discharge state; and
    an instructing unit operable to instruct the power supply unit to suspend or reduce the electric power supply to the metal halide lamp upon a judgment by the judging unit that the currently occurring discharge is in either of the outer-tube discharge state and the preceding state.

2. The lighting system according to claim 1, wherein
    the judging unit is operable to judge that the currently occurring discharge is in either of the outer-tube discharge state and the preceding state, if the detected electrical property differs at least from an electrical property of the metal halide lamp under normal operation.

3. The lighting system according to claim 1, wherein
    the judging unit is operable to judge that the currently occurring discharge is in either of the outer-tube discharge state and the preceding state, based on a characteristic specific to a discharge in the outer-tube discharge state or the preceding state.

4. The lighting system according to claim 3, wherein
    the electrical property detected by the detecting unit is at least either of a lamp current and a lamp voltage.

5. The lighting system according to claim 3, wherein
    the specific characteristic is that the discharge repeats fading-out and re-starting, and
    the judging unit is operable to count, based on the detected electrical property, occurrences of fading-out or re-starting, and to judge that the currently occurring discharge is in either of the outer-tube discharge state and the preceding state if the count reaches a predetermined count.

6. The lighting system according to claim 3, wherein
    the specific characteristic is that the electrical property fluctuates widely, and
    the judging unit is operable to count fluctuations of the detected electrical property beyond a reference level that is determined based on an electrical property of the metal halide lamp under normal operation, and to-judge that the currently occurring discharge is in the outer-tube discharge state if the count reaches a predetermined count.

7. The lighting system according to claim 3, wherein
    the power supply unit is operable to supply an alternating current power,
    the specific characteristic is that a half-wave discharge occurs, and
    the judging unit is operable to judge that the currently occurring discharge is in the outer-tube discharge state if the detecting unit repeatedly detects an electrical property specific to a half-wave discharge.

8. The lighting system according to claim 7, wherein
    the judging unit is operable to judge that an electrical property specific to a half-wave discharge is repeatedly detected, if a duration or occurrences of the half-wave discharge reaches a predetermined value.

9. The lighting system according to claim 3, wherein
    the specific characteristic is that an outer-tube discharge stably continues, and
    the judging unit is operable to count a number of times that the detected electrical property exceeds a predetermined upper limit or that the detected electrical property is below a predetermined lower limit, and to judge that the currently occurring discharge is in the outer-tube discharge state if the count reaches- a predetermined count.

10. The lighting system according to claim 3, wherein.
    the specific characteristic is that an outer-tube discharge stably continues, and
    the judging unit is operable-to measure a duration that the detected electrical property exceeds a predetermined upper limit or that the detected electrical property is below a predetermined lower limit, and to judge that the currently occurring discharge is in the outer-tube discharge state if the measured duration reaches a predetermined duration.

11. The lighting system according to claim 3, wherein
    the power supply unit is operable to supply an alternating current power that is cyclically reversed between positive and negative polarities,
    the detecting unit is operable to detect the electrical property for the respective polarities, and
    the judging unit is operable to make a judgment based on the electrical property for the respective polarities.

12. The lighting system according to claim 3, wherein
    the power supply unit is operable to supply an alternating current power that is cyclically reversed between positive and negative polarities,
    the specific characteristic is that the electrical property abruptly changes immediately after polarity reversal,
    the detecting unit is operable to detect the electrical property immediately after polarity reversal, and
    the judging unit is operable to judge that the currently occurring discharge is in the outer-tube discharge state, if the electrical property abruptly changes.

13. The lighting system according to claim 12, wherein
    the judging unit is operable to judge that the electrical property changes abruptly, if the electrical property detected a predetermined time period after polarity reversal is equal to or greater than a predetermined value.

14. The lighting system according to claim 12, wherein
    the judging unit is operable to judge that the electrical property abruptly changes, if an average or effective value calculated from the electrical property detected a predetermined time period after polarity reversal is equal to or greater than a predetermined value.

15. The lighting system according to claim 12, wherein
    the judging unit is operable to judge that the currently occurring discharge is in the outer-tube discharge state, if a count of occurrences of abrupt changes immediately after polarity reversal reaches a predetermined count.

16. The lighting system according to claim 1, wherein. the lamp lighting device provides, for a predetermined time period from start-up of the metal halide lamp, a mask period during which the judgment unit is inhibited from judging whether the currently occurring discharge is in either of the outer-tube discharge state and the preceding state.

17. The lighting system according to claim 1, wherein the outer tube is evacuated to vacuum.

18. The lighting system according to claim 1, wherein the outer tube is filled with nitrogen gas.

19. The lighting system according to claim 1, wherein the arc tube is filled with xenon gas as buffer gas.

20. The lighting system according to claim 1, wherein the arc tube is filled with metal halides which at least include praseodymium halide and sodium halide.

21. The lighting system according to claim 1, wherein the arc tube is filled with metal halides which at least include cerium halide and sodium halide.

22. The lighting system according to claim 1, wherein the arc tube includes a pair of electrodes, and $L/D \geq 4$ is satisfied, where D denotes an inner diameter of the arc tube in millimeters and L denotes a distance between the electrodes in millimeters.

* * * * *